(12) United States Patent     (10) Patent No.:   US 12,602,059 B2

Mayuzumi et al.     (45) Date of Patent:    Apr. 14, 2026

(54) ROBOT, CONTROL METHOD FOR ROBOT, AND RECORDING MEDIUM

(71) Applicant: CASIO COMPUTER CO., LTD., Tokyo (JP)

(72) Inventors: Kouki Mayuzumi, Tokyo (JP); Erina Ichikawa, Tokyo (JP); Hirokazu Hasegawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 184 days.

(21) Appl. No.: 18/393,702

(22) Filed: Dec. 22, 2023

(65) Prior Publication Data

US 2024/0248486 A1     Jul. 25, 2024

(30) Foreign Application Priority Data

Jan. 25, 2023    (JP) ................................. 2023-009341

(51) Int. Cl.
| | |
|---|---|
| G05D 1/49 | (2024.01) |
| G05D 1/241 | (2024.01) |
| G05D 105/30 | (2024.01) |
| G05D 111/50 | (2024.01) |

(52) U.S. Cl.
CPC .............. G05D 1/49 (2024.01); G05D 1/241 (2024.01); G05D 2105/32 (2024.01); G05D 2111/52 (2024.01)

(58) Field of Classification Search
CPC ...... G05D 1/49; G05D 1/241; G05D 2105/32; G05D 2111/52

USPC ............................................................ 701/23
See application file for complete search history.

(56) References Cited

U.S. PATENT DOCUMENTS

| | | | | |
|---|---|---|---|---|
| 8,041,456 | B1 * | 10/2011 | Blackwell .............. | B25J 9/1674 901/1 |
| 11,787,050 | B1 * | 10/2023 | Kaehler ................. | B25J 11/008 700/253 |
| 2012/0061155 | A1 * | 3/2012 | Berger ................... | B25J 9/0006 180/21 |
| 2012/0197464 | A1 * | 8/2012 | Wang ......................... | B25J 5/00 701/28 |
| 2012/0310412 | A1 * | 12/2012 | Seo ......................... | B25J 9/0006 700/254 |
| 2012/0316682 | A1 * | 12/2012 | Seo ...................... | B62D 57/032 901/1 |
| 2022/0118602 | A1 * | 4/2022 | Kawabe ............... | G06V 40/174 |
| 2025/0100128 | A1 * | 3/2025 | Kanamura ........... | B25J 11/0005 |

FOREIGN PATENT DOCUMENTS

| | | |
|---|---|---|
| JP | 2003071752 A | 3/2003 |
| WO | 2020158641 A1 | 8/2020 |

\* cited by examiner

*Primary Examiner* — Yazan A Soofi

(74) *Attorney, Agent, or Firm* — Holtz, Holtz & Volek PC

(57) ABSTRACT

A robot includes a torso, a head coupled to the torso so as to be rotatable with respect to the torso, and at least one processor. The at least one processor determines whether the torso is inclined from a horizontal direction and, in a case where a determination is made that the torso is inclined from the horizontal direction, controls an actuator to rotate the head with respect to the torso such that the head faces the horizontal direction.

20 Claims, 15 Drawing Sheets

FIG. 9

| EVENT NO. | CONTENT OF EXTERNAL STIMULUS (EVENT) |
|---|---|
| 1 | THERE IS A LOUD SOUND |
| 2 | SPOKEN TO |
| 3 | HORIZONTAL, BODY IS PETTED |
| 4 | HORIZONTAL, HEAD IS PETTED |
| 5 | HELD, BODY IS PETTED |
| 6 | HELD, HEAD IS PETTED |
| 7 | TURNED UPSIDE DOWN |
| 8 | HEAD LOWERED |
| 9 | BECAME DARKER |
| 10 | BECAME BRIGHTER |
| 11 | PICKED UP |
| 12 | WHIMSICAL ACTION (TIMER STARTUP) |

ROBOT, CONTROL METHOD FOR ROBOT, AND RECORDING MEDIUM

CROSS-REFERENCE TO RELATED APPLICATIONS

This application is based upon and claims the benefit of priority under 35 USC 119 of Japanese Patent Application No. 2023-009341, filed on Jan. 25, 2023, the entire disclosure of which, including the description, claims, drawings, and abstract, is incorporated herein by reference in its entirety.

FIELD OF THE INVENTION

The present disclosure relates to a robot, a control method for the robot, and a recording medium.

BACKGROUND OF THE INVENTION

In the related art, robots are known that simulate living organisms such as pets. For example, Japanese Unexamined Patent Application No. 2003-71752 discloses technology of attitude stabilization control in a pet-type robot that resembles the body and imitates the actions of an animal.

SUMMARY OF THE INVENTION

A robot according to one embodiment of the present disclosure includes:
  a torso;
  a head coupled to the torso so as to be rotatable with respect to the torso; and
  at least one processor configured to
    determine whether the torso is inclined from a horizontal direction, and
    in a case where a determination is made that the torso is inclined from the horizontal direction, control an actuator to rotate the head with respect to the torso such that the head faces the horizontal direction.
A control method for a robot according to one embodiment of the present disclosure is a control method for a robot that includes a torso, and a head coupled to the torso so as to be rotatable with respect to the torso, the control method including:
  determining whether the torso is inclined from a horizontal direction; and
  in a case where a determination is made that the torso is inclined from the horizontal direction, controlling an actuator to rotate the head with respect to the torso such that the head faces the horizontal direction.
A recording medium according to one embodiment of the present disclosure is a non-transitory recording medium storing a program readable by a computer of a robot that includes a torso, and a head coupled to the torso so as to be rotatable with respect to the torso, the program causing the computer to realize:
  an incline determination function that determines whether the torso is inclined from a horizontal direction; and
  an action control function that, in a case where a determination is made by the incline determination function that the torso is inclined from the horizontal direction, controls an actuator to rotate the head with respect to the torso such that the head faces the horizontal direction.

BRIEF DESCRIPTION OF DRAWINGS

A more complete understanding of this application can be obtained when the following detailed description is considered in conjunction with the following drawings, in which:

FIG. 9 is a drawing illustrating an example of an external stimulus according to the embodiment:

DETAILED DESCRIPTION OF THE INVENTION

Figure 1:
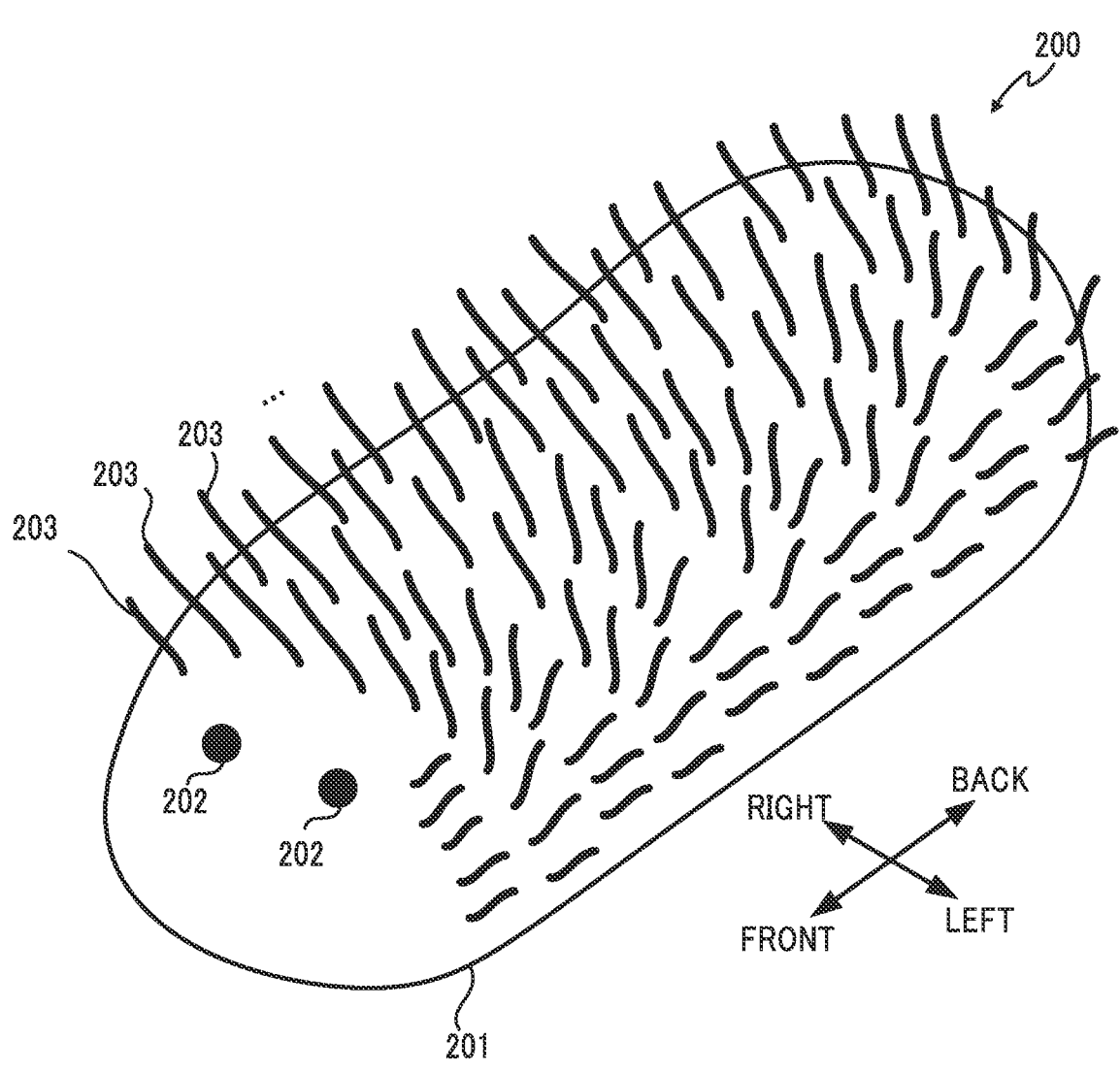
FIG. 1 is a drawing illustrating the appearance of a robot according to an embodiment.

Hereinafter, embodiments of the present disclosure are described while referencing the drawings. Note that, in the drawings, identical or corresponding components are denoted with the same reference numerals.

Figure 2:
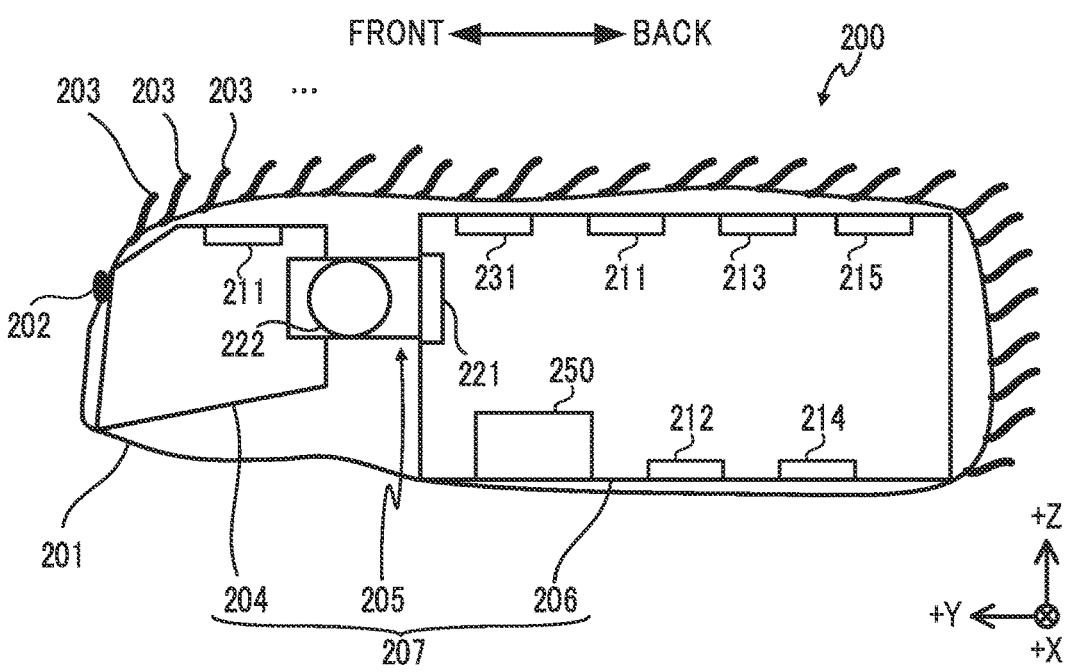
FIG. 2 is a cross-sectional view of the robot according to the embodiment, viewed from a side surface.
Figure 3:
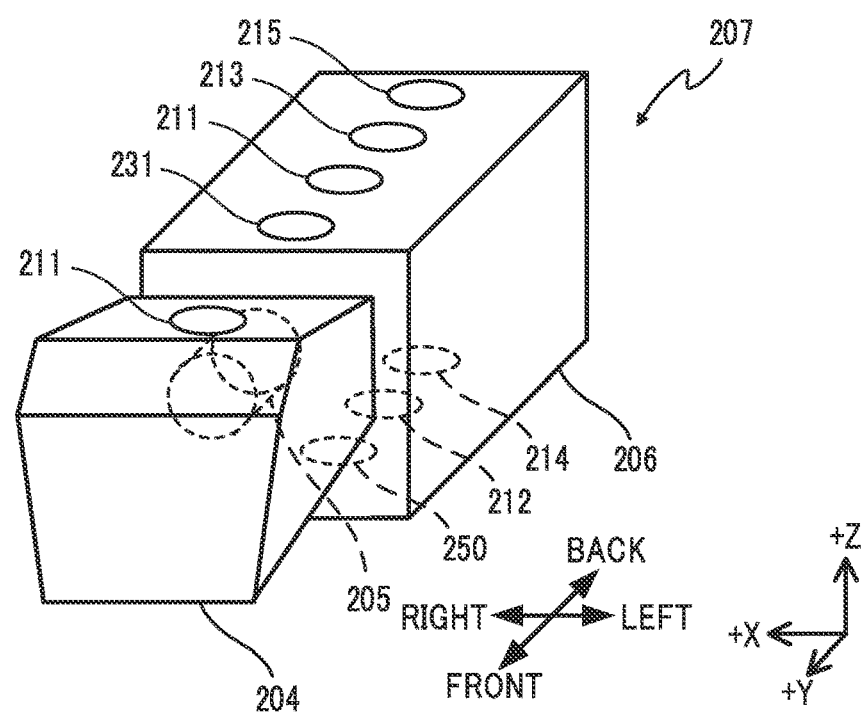
FIG. 3 is a drawing illustrating a housing of the robot according to the embodiment.

FIGS. 1 to 3 illustrate the appearance of a robot 200 according to the present embodiment. As illustrated in FIG. 1, the robot 200 is a pet robot that resembles a small animal. The robot 200 includes an exterior 201 provided with decorative parts 202 resembling eyes and bushy fur 203.

As illustrated in FIGS. 2 and 3, the robot 200 includes a housing 207. The housing 207 is covered by the exterior 201, and is accommodated inside the exterior 201. The housing 207 includes a head 204, a coupler 205, and a torso 206. The coupler 205 couples the head 204 to the torso 206.

The exterior 201 is an example of an exterior member, is elongated in a front-back direction, and has a bag-like shape that is capable of accommodating the housing 207 therein. The exterior 201 is formed in a barrel shape from the head 204 to the torso 206, and integrally covers the torso 206 and the bead 204. Due to the exterior 201 having such a shape, the robot 200 is formed in a shape as if lying on its belly.

An outer material of the exterior 201 simulates the feel to touch of a small animal, and is formed from an artificial pile fabric that resembles the fur 203 of a small animal. A lining of the exterior 201 is formed from synthetic fibers, natural fibers, natural leather, artificial leather, a synthetic resin sheet material, a rubber sheet material, or the like. The exterior 201 is formed from such a flexible material and, as such, conforms to the movement of the housing 207. Specifically, the exterior 201 conforms to the rotation of the head 204 relative to the torso 206.

In order to configure so that the exterior 201 conforms to the movement of the housing 207, the exterior 201 is attached to the housing 207 by non-illustrated snap buttons. Specifically, at least one snap button is provided at the front of the head 204, and at least one snap button is provided at the rear of the torso 206. Moreover, snap buttons, that engage with the snap buttons provided on the head 204 and the torso 206, are also provided at corresponding positions of the exterior 201, and the exterior 201 is fixed to the housing 207 by the snap buttons. Note that the numbers and positions of the snap buttons are merely examples, and can be changed as desired.

The torso 206 extends in the front-back direction, and contacts, via the exterior 201, a placement surface such as a floor, a table, or the like on which the robot 200 is placed. The torso 206 includes a twist motor 221 at a front end thereof. The head 204 is coupled to the front end of the torso 206 via the coupler 205. The coupler 205 includes a vertical motor 222. Note that, in FIG. 2, the twist motor 221 is provided on the torso 206, but may be provided on the coupler 205. Due to the twist motor 221 and the vertical motor 222, the head 204 is coupled to the torso 206 so as to be rotatable, around a left-right direction and the front-back direction of the robot 200, with respect to the torso 206.

Note that, as XYZ coordinate axes, an X axis and a Y axis are set in the horizontal plane, and a Z axis is set in the vertical direction. The + direction of the Z axis corresponds to vertically upward. Moreover, to facilitate comprehension, in the following, a description is given in which the robot 200 is placed on the placement surface and oriented such that the left-right direction (the width direction) of the robot 200 is the X axis direction and the front-back direction of the robot 200 is the Y axis direction.

Figure 4:
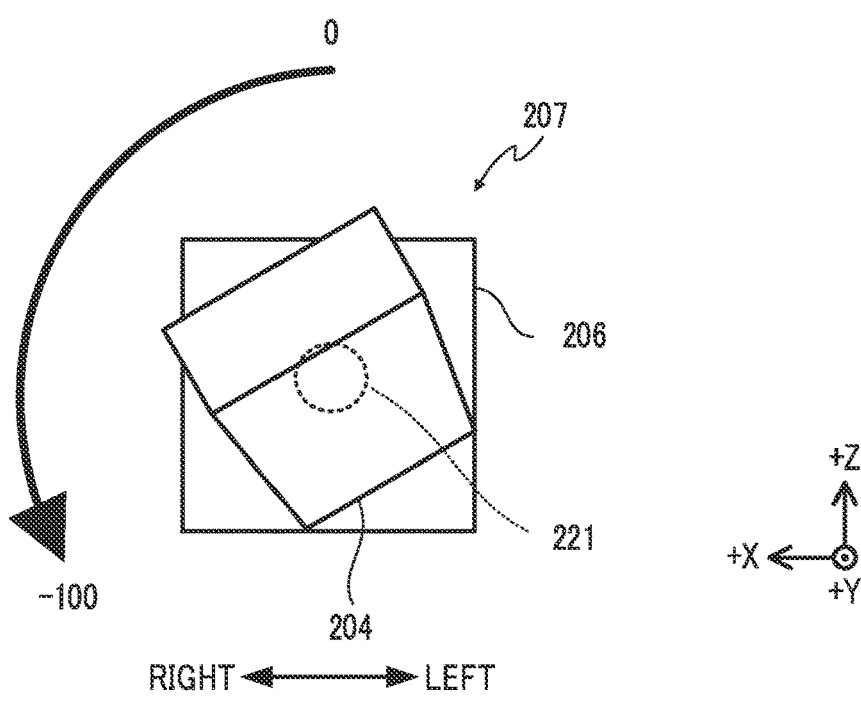
FIG. 4 is a first drawing illustrating movement of a twist motor of the robot according to the embodiment.
Figure 5:
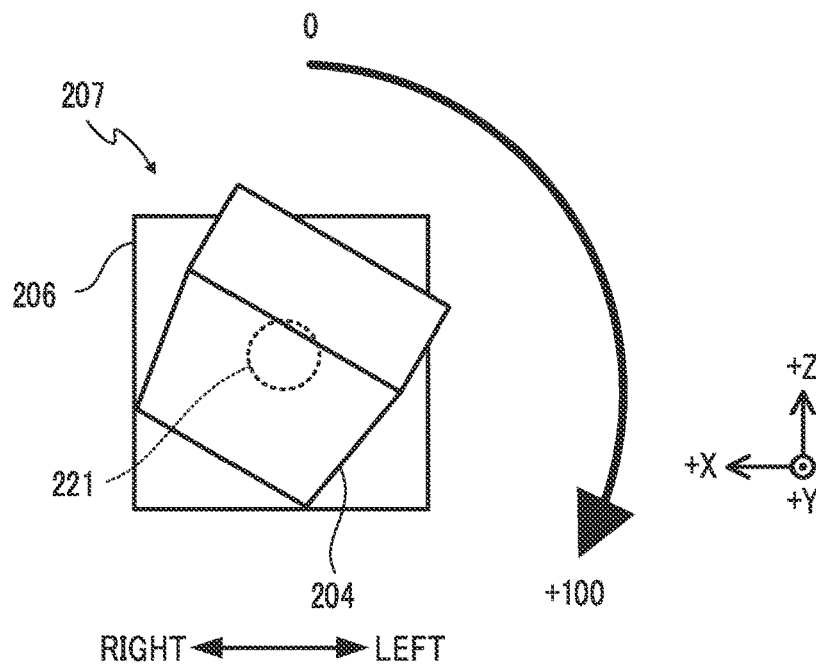
FIG. 5 is a second drawing illustrating movement of the twist motor of the robot according to the embodiment.

The coupler 205 couples the torso 206 and the head 204 so as to enable rotation around a first rotational axis that passes through the coupler 205 and extends in the front-back direction (the Y direction) of the torso 206. As illustrated in FIGS. 4 and 5, the twist motor 221 rotates the head 204, with respect to the torso 206, clockwise (right rotation) within a forward rotation angle range around the first rotational axis (forward rotation), counter-clockwise (left rotation) within a reverse rotation angle range around the first rotational axis (reverse rotation), and the like.

Note that, in this description, the term "clockwise" refers to clockwise when viewing the direction of the head 204 from the torso 206. Additionally, herein, clockwise rotation is also referred to as "twist rotation to the right", and counter-clockwise rotation is also referred to as "twist rotation to the left." A maximum value of an angle of twist rotation to the right or the left can be set as desired. In FIGS. 4 and 5, the angle of the head 204 in a state in which the head 204 is not twisted to the right or the left (hereinafter, "twist reference angle") is expressed by 0. An angle when twist rotated most to the left (rotated counter-clockwise) is expressed as −100, and an angle when twist rotated most to the right (rotated clockwise) is expressed as +100.

Figure 6:
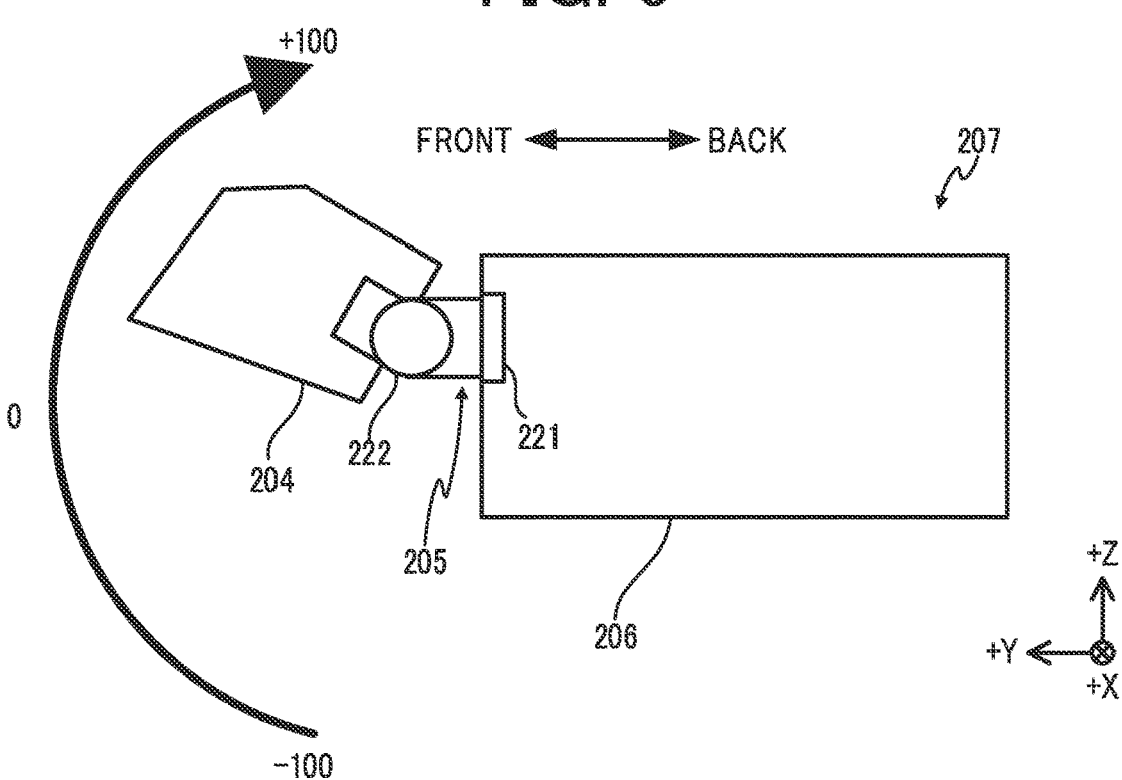
FIG. 6 is a first drawing illustrating movement of a vertical motor of the robot according to the embodiment.
Figure 7:
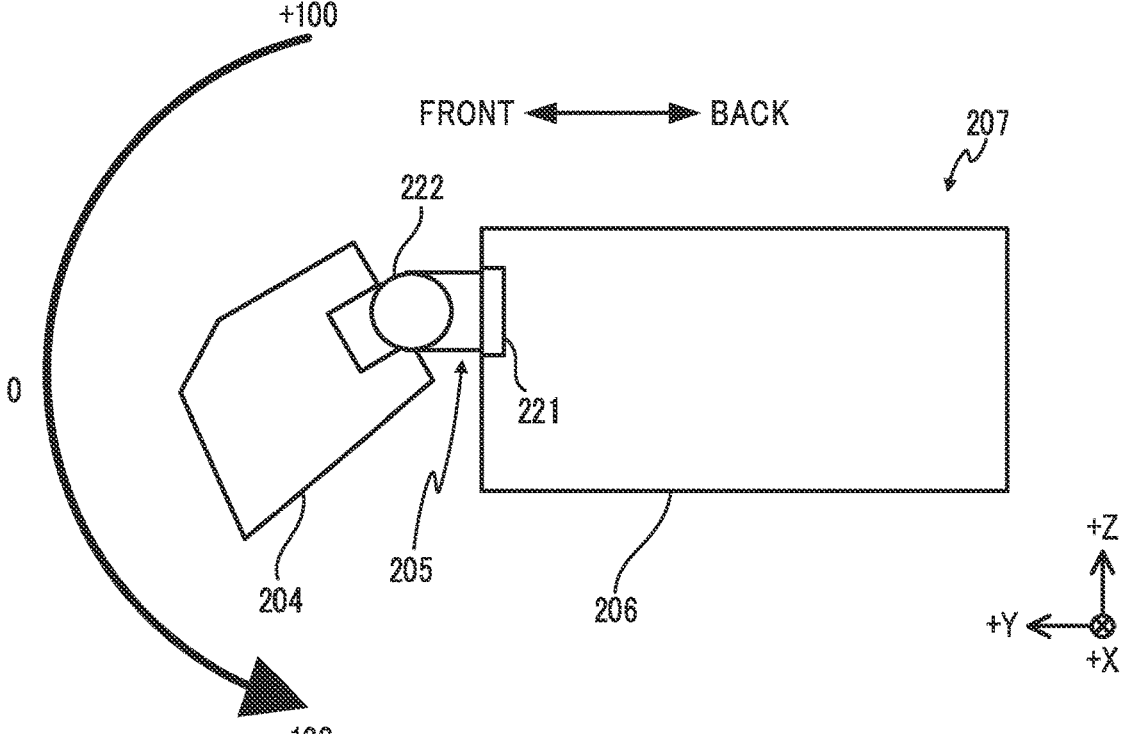
FIG. 7 is a second drawing illustrating movement of the vertical motor of the robot according to the embodiment.

Additionally, the coupler 205 couples the torso 206 and the head 204 so as to enable rotation around a second rotational axis that passes through the coupler 205 and extends in the left-right direction (the width direction, the X direction) of the torso 206. As illustrated in FIGS. 6 and 7, the vertical motor 222 rotates the head 204 upward (forward rotation) within a forward rotation angle range around the second rotational axis, downward (reverse rotation) within a reverse rotation angle range around the second rotational axis, and the like.

A maximum value of the angle of rotation upward or downward can be set as desired, and, in FIGS. 6 and 7, the angle of the head 204 in a state in which the head 204 is not rotated upward or downward (hereinafter, "vertical reference angle") is expressed by 0, an angle when rotated most downward is expressed as −100, and an angle when rotated most upward is expressed as +100.

As illustrated in FIGS. 2 and 3, the robot 200 includes a touch sensor 211 on the head 204 and the torso 206. The robot 200 can detect, by the touch sensor 211, petting or striking of the head 204 or the torso 206 by the user.

The robot 200 includes, on the torso 206, an acceleration sensor 212, a microphone 213, a gyrosensor 214, an illuminance sensor 215, a speaker 231, and a battery 250. By using the acceleration sensor 212 and the gyrosensor 214, the robot 200 can detect a change of an attitude of the robot 200 itself, and can detect being picked up, the orientation being changed, being thrown, and the like by the user. The robot 200 can detect the ambient illuminance of the robot 200 by using the illuminance sensor 215. The robot 200 can detect external sounds by using the microphone 213. The robot 200 can emit sounds by using the speaker 231.

Note that, at least a portion of the acceleration sensor 212, the microphone 213, the gyrosensor 214, the illuminance sensor 215, and the speaker 231 is not limited to being provided on the torso 206 and may be provided on the head 204, or may be provided on both the torso 206 and the head 204.

Figure 8:
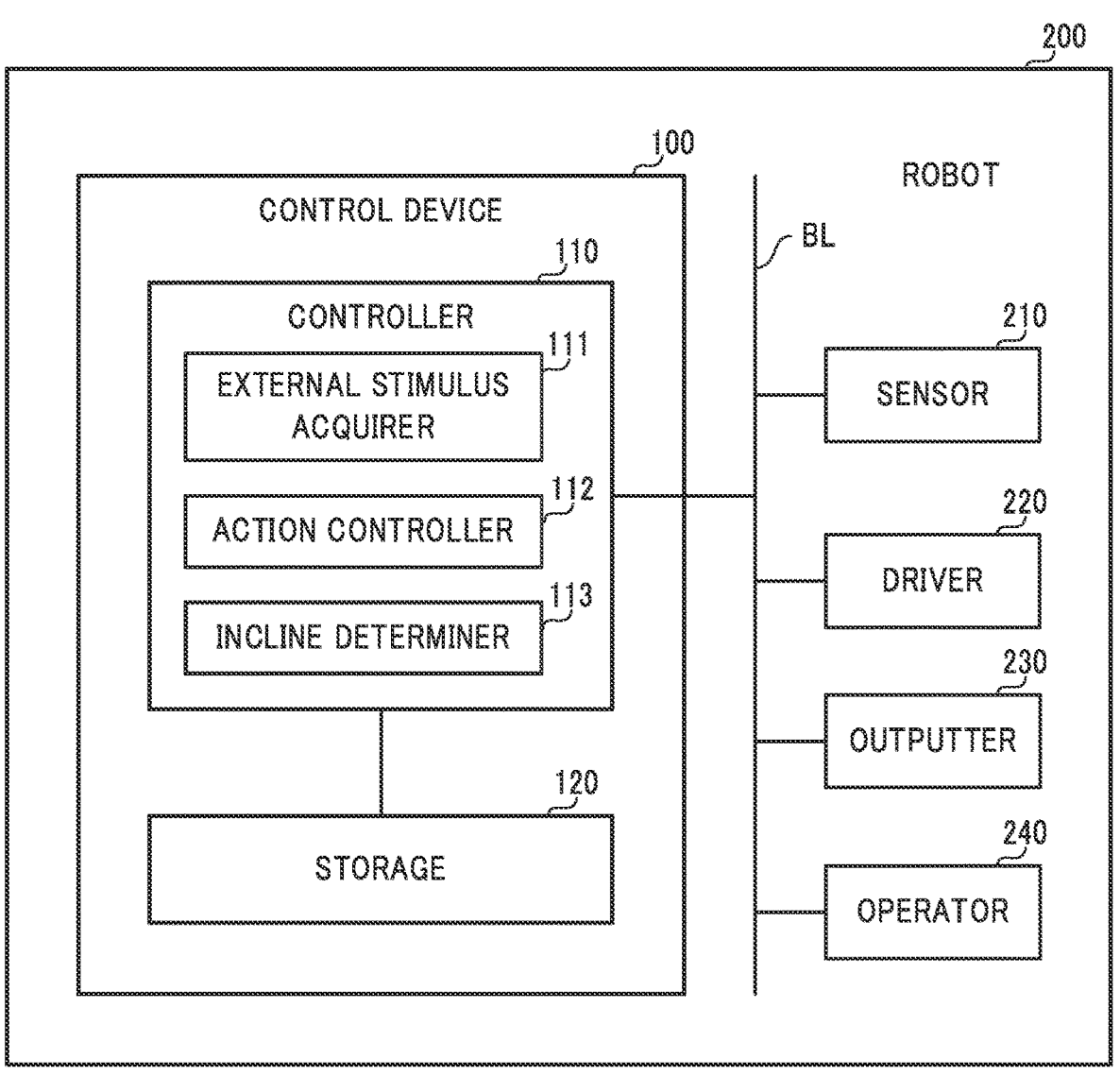
FIG. 8 is a block diagram illustrating the functional configuration of the robot according to the embodiment.

Next, the functional configuration of the robot 200 is described while referencing FIG. 8. As illustrated in FIG. 8, the robot 200 includes a control device 100, a sensor 210, a driver 220, an outputter 230, and an operator 240. In one example, these various components are connected via a bus line BL. Note that a configuration is possible in which, instead of the bus line BL, a wired interface such as a universal serial bus (USB) cable or the like, or a wireless interface such as Bluetooth (registered trademark) or the like is used.

The control device 100 includes a controller 110 and a storage 120. The control device 100 controls the actions of the robot 200 by the controller 110 and the storage 120.

The controller 110 includes a central processing unit (CPU). In one example, the CPU is a microprocessor or the like and is a central processing unit that executes a variety of processing and computations. In the controller 110, the CPU reads out a control program stored in the ROM and controls the behavior of the entire robot 200 while using the RAM as working memory. Additionally, while not illustrated in the drawings, the controller 110 is provided with a clock function, a timer function, and the like, and can measure the date and time, and the like. The controller 110 may also be called a "processor."

The storage 120 includes read-only memory (ROM), random access memory (RAM), flash memory, and the like. The storage 120 stores an operating system (OS), application programs, and other programs and data used by the controller 110 to perform the various processes. Moreover, the storage unit 120 stores data generated or acquired as a result of the controller 110 performing the various processes.

The sensor 210 includes the touch sensor 211, the acceleration sensor 212, the gyrosensor 214, and the microphone 213 described above. The controller 110 acquires, via the bus line BL and as an external stimulus, detection values detected by the various sensors of the sensor 210. Note that a configuration is possible in which the sensor 210 includes sensors other than the touch sensor 211, the acceleration sensor 212, the gyrosensor 214, and the microphone 213. The types of external stimuli acquirable by the controller 110 can be increased by increasing the types of sensors of the sensor 210.

The touch sensor 211 includes, for example, a pressure sensor and a capacitance sensor, and detects contacting by some sort of object. The controller 110 can, on the basis of detection values of the touch sensor 211, detect that the robot 200 is being pet, is being struck, and the like by the user.

The acceleration sensor 212 detects an acceleration applied to the torso 206 of the robot 200. The acceleration sensor 212 detects acceleration in each of the X axis direction, the Y axis direction, and the Z axis direction. That is, the acceleration sensor 212 detects acceleration on three axes.

In one example, the acceleration sensor 212 detects gravitational acceleration when the robot 200 is stationary. The controller 110 can detect the current attitude of the robot 200 on the basis of the gravitational acceleration detected by the acceleration sensor 212. In other words, the controller 110 can detect whether the housing 207 of the robot 200 is inclined from the horizontal direction on the basis of the gravitational acceleration detected by the acceleration sensor 212. Thus, the acceleration sensor 212 functions as incline detecting means that detects the inclination of the robot 200.

Additionally, when the user picks up or throws the robot 200, the acceleration sensor 212 detects, in addition to the gravitational acceleration, acceleration caused by the movement of the robot 200. Accordingly, the controller 110 can detect the passive movement of the robot 200 by removing the gravitational acceleration component from the detection value detected by the acceleration sensor 212.

The gyrosensor 214 detects an angular velocity from when rotation is applied to the torso 206 of the robot 200. Specifically, the gyrosensor 214 detects the angular velocity on three axes of rotation, namely rotation around the X axis direction, rotation around the Y axis direction, and rotation around the Z axis direction. It is possible to more accurately detect the passive movement of the robot 200 by combining the detection value detected by the acceleration sensor 212 and the detection value detected by the gyrosensor 214.

Note that, at a synchronized timing (for example every 0.25 seconds), the touch sensor 211, the acceleration sensor 212, and the gyrosensor 214 respectively detect the strength of contact, the acceleration, and the angular velocity, and output the detection values to the controller 110.

The microphone 213 detects ambient sound of the robot 200. The controller 110 can, for example, detect, on the basis of a component of the sound detected by the microphone 213, that the user is speaking to the robot 200, that the user is clapping their hands, and the like.

The illuminance sensor 215 detects the illuminance of the surroundings of the robot 200. The controller 110 can detect that the surroundings of the robot 200 have become brighter or darker on the basis of the illuminance detected by the illuminance sensor 215.

The driver 220 includes the twist motor 221 and the vertical motor 222, and is driven by the controller 110. The twist motor 221 is a servo motor for rotating the head 204, with respect to the torso 206, in the left-right direction (the width direction) with the front-back direction as an axis. The vertical motor 222 is a servo motor for rotating the head 204, with respect to the torso 206, in the up-down direction (height direction) with the left-right direction as an axis. The robot 200 can express actions of turning the head 204 to the side by using the twist motor 221, and can express actions of lifting/lowering the head 204 by using the vertical motor 222.

The outputter 230 includes the speaker 231, and sound is output from the speaker 231 as a result of sound data being input into the outputter 230 by the controller 110. For example, the robot 200 emits a pseudo-animal sound as a result of the controller 110 inputting animal sound data of the robot 200 into the outputter 230.

A configuration is possible in which, instead of the speaker 231, or in addition to the speaker 231, a display such as a liquid crystal display, a light emitter such as a light emitting diode (LED), or the like is provided as the outputter 230, and emotions such as joy, sadness, and the like are displayed on the display, expressed by the color and brightness of the emitted light, or the like.

The operator 240 includes an operation button, a volume knob, or the like. In one example, the operator 240 is an interface for receiving user operations such as turning the power ON/OFF, adjusting the volume of the output sound, and the like.

The battery 250 stores power to be used in the robot 200. When the robot 200 has returned to the charging station, the battery 250 is charged by the charging station.

Next, the functional configuration of the controller 110 is described. As illustrated in FIG. 8, the controller 110 functionally includes an external stimulus acquirer 111 that is an example of external stimulus acquiring means, an action controller 112 that is an example of action controlling means, and inclination determiner 113 that is an example of inclination determining means. In the controller 110, the CPU performs control and reads the program stored in the ROM out to the RAM and executes that program, thereby functioning as the various components described above.

The external stimulus acquirer 111 acquires an external stimulus. The external stimulus is a stimulus that acts on the robot 200 from outside the robot 200. Examples of types of the external stimulus include "there is a loud sound", "spoken to", "petted", "picked up", "turned upside down", "became brighter", "became darker", and the like. In the following, the types of external stimuli are also referred to as "events."

The external stimulus acquirer 111 acquires the external stimulus on the basis of detection values from the sensor 210. More specifically, the external stimulus acquirer 111 acquires a plurality of external stimuli of mutually different types by the plurality of sensors (the touch sensor 211, the acceleration sensor 212, the microphone 213, the gyrosensor 214, and the illuminance sensor 215) of the sensor 210.

As one example, FIG. 9 illustrates types (events) of external stimuli acquirable by the external stimulus acquirer 111. The external stimulus acquirer 111 acquires the external stimulus of "there is a loud sound" or "spoken to" by the microphone 213. The external stimulus acquirer 111 acquires the external stimulus of "petted" by the touch sensor 211. The external stimulus acquirer 111 acquires the external stimulus of "picked up", or "turned upside down" by the acceleration sensor 212 and the gyrosensor 214. The external stimulus acquirer 111 acquires the external stimulus of "became brighter" or "became darker" by the illuminance sensor 215.

When an external stimulus is acquired by the external stimulus acquirer 111, the action controller 112 causes the robot 200 to execute a corresponding action that is an action corresponding to the type of the acquired external stimulus. For example, in the case of "there is a loud sound", the action controller 112 causes the robot 200 to execute a surprised action. In the case of "spoken to", the action controller 112 causes the robot 200 to execute an action of reacting to being spoken to. In the case of "turned upside down", the action controller 112 causes the robot 200 to execute an action of expressing an unpleasant reaction. In the case of "petted", the action controller 112 causes the robot 200 to execute an action of rejoicing.

Here, the action that the action controller 112 causes the robot 200 to execute is realized by a motion by the driver 220 and/or an output by the outputter 230. Specifically, the motion by the driver 220 corresponds to rotating the head 204 by the driving of the twist motor 221 or the vertical motor 222. The output by the outputter 230 corresponds to outputting a sound from the speaker 231, displaying an image on the display, or causing the LED to emit light. The actions of the robot 200 may also be called gestures, behaviors, or the like of the robot 200.

Although omitted from the drawings, the correspondence between the type of the external stimulus and the corresponding action is stored in advance in the storage 120 as an action table. The action controller 112 references the action table and causes the robot 200 to execute the corresponding action corresponding to the type of the external stimulus acquired by the external stimulus acquirer 111.

Note that, when an external stimulus is not acquired by the external stimulus acquirer 111, the action controller 112 causes the robot 200 to execute a spontaneous action. The phrase "spontaneous action" means an action that is not dependent on an external stimulus such as, for example, an action simulating breathing, or the like.

Returning to FIG. 8, the incline determiner 113 determines whether the torso 206 is inclined from the horizontal direction. For example, when the robot 200 is placed diagonal with respect to the horizontal direction such as in a case in which the robot 200 is placed on an inclined placement surface, a placement surface having unevennesses, or the like, the torso 206 is in a state inclined from the horizontal direction. Alternatively, the torso 206 becomes inclined from the horizontal direction due to the external stimuli of "picked up", "turned upside down", and the like among the external stimuli acquired by the external stimulus acquirer 111. The incline determiner 113 determines whether the torso 206 is inclined from the horizontal direction due to such a situation.

Specifically, the incline determiner 113 determines, on the basis of the detection values from the acceleration sensor 212 provided on the torso 206, a direction of gravitational acceleration applied to the torso 206. Moreover, the incline determiner 113 determines, on the basis of the relationship between the direction of gravitational acceleration and a reference plane preset in the torso 206, whether the torso 206 is inclined from the horizontal direction.

Generally, living organisms demonstrate a physiological reflex (righting response) of maintaining the head at horizontal to the ground when the torso is inclined from the horizontal direction. In other words, living organisms have a trait of, when the torso is inclined from the horizontal direction, not maintaining the head in the same inclined state as the torso but, rather, rotating the head with respect to the torso to maintain the head at horizontal to the ground surface.

In a case in which this trait of living organisms is considered, when the housing 207 of the robot 200 is inclined from the horizontal direction, it would be unnatural as an attitude of a living organism for the head 204 to be maintained as-is in a state straight from the torso 206. As such, in order to simulate the natural attitude of a living organism, when the incline determiner 113 determines that the torso 206 is inclined from the horizontal direction, the action controller 112 causes the head 204 to rotate with respect to the torso 206 so that the head 204 faces the horizontal direction.

Figure 10A:
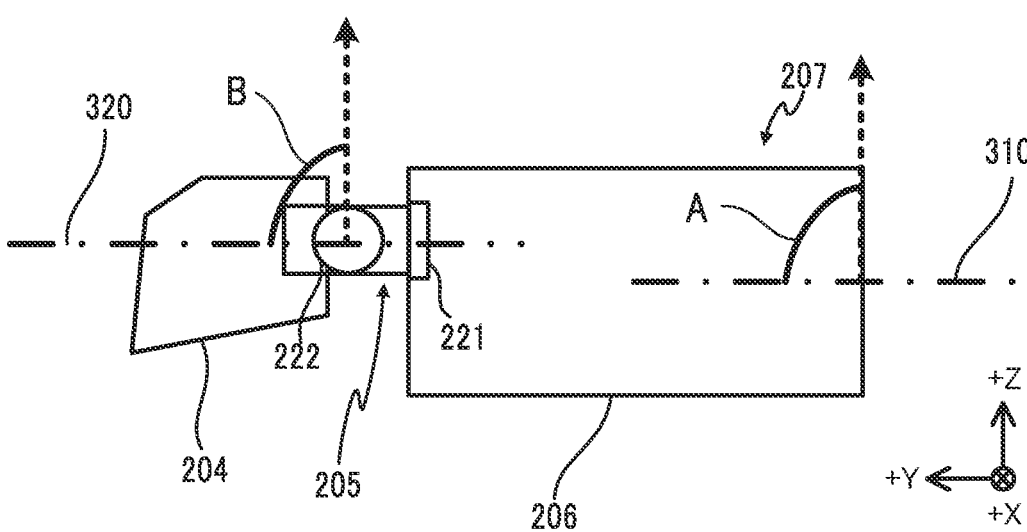
FIG. 10A is drawing, viewed from a side surface, of a housing of the robot according to the embodiment in a case in which the robot is in a proper attitude state.
Figure 11A:
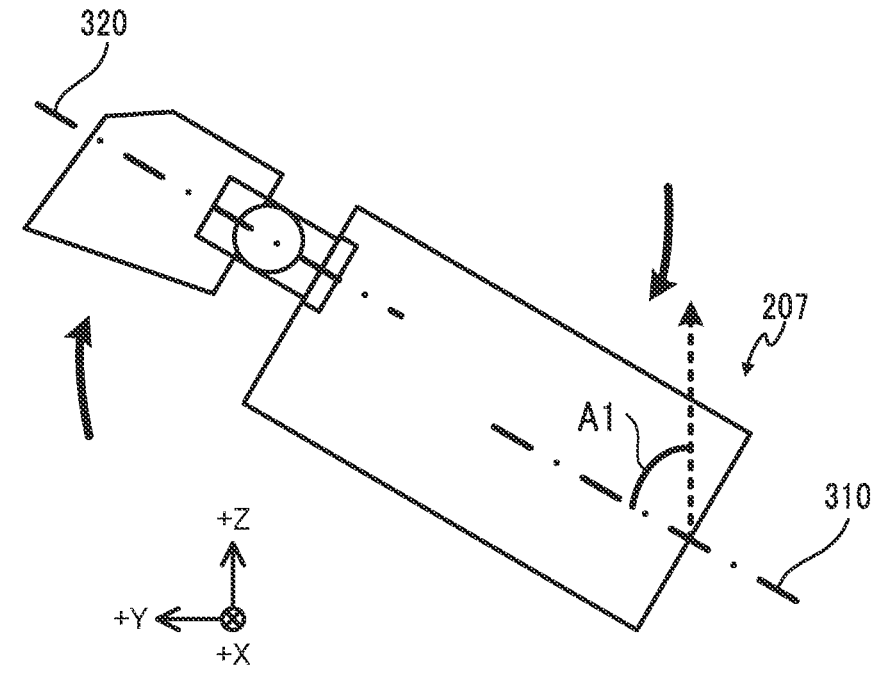
FIG. 11A is a first drawing illustrating a motion of a head in a case in which the robot according to the embodiment is inclined in a front-back direction, and is a drawing illustrating a state prior to the head moving.
Figure 11B:
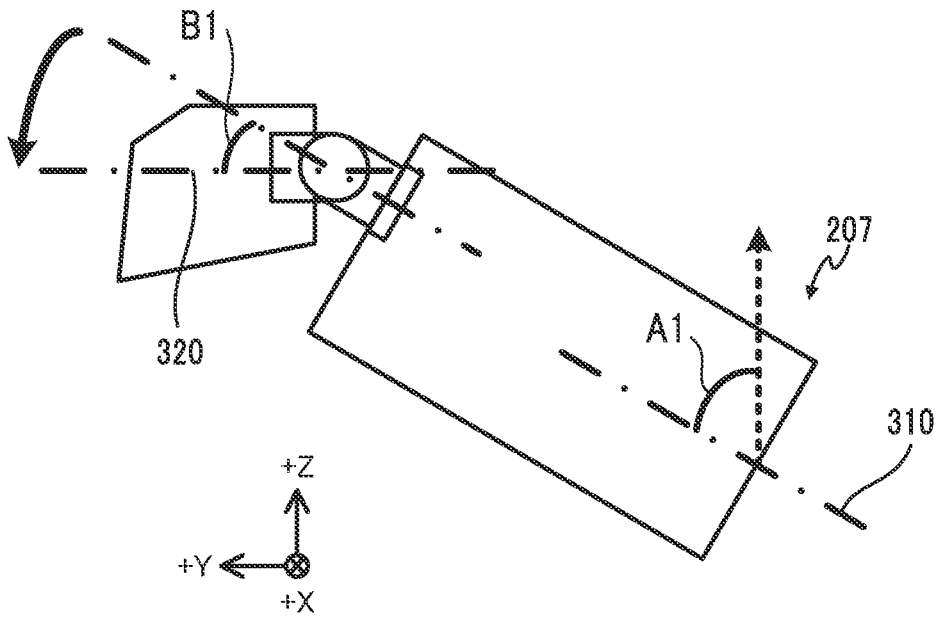
FIG. 11B is a first drawing illustrating a motion of the head in a case in which the robot according to the embodiment is inclined in the front-back direction, and is a drawing illustrating a state after the head moves.

FIGS. 10A and 11B illustrate the robot 200 in a proper attitude state in which the robot 200 is not inclined from the horizontal direction. Here, the term "proper attitude state" refers to a state in which the head 204 is not rotated in any direction with respect to the torso 206, and refers to an initial state that serves as a reference of the inclination of the robot 200.

Figure 10B:
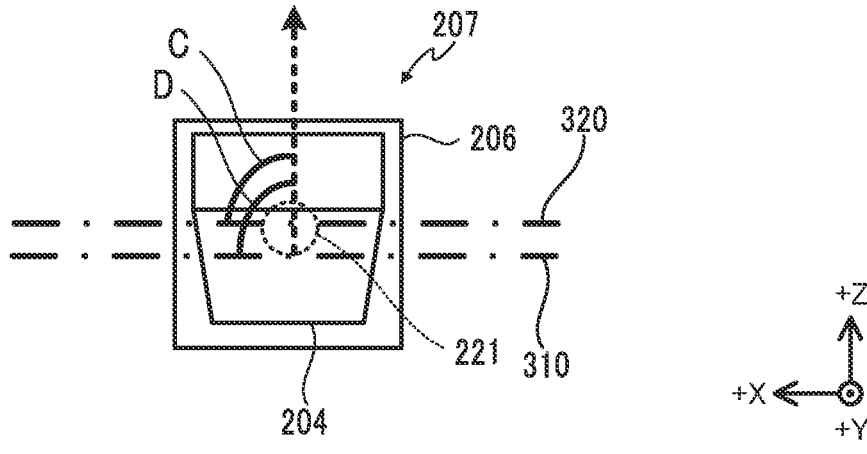
FIG. 10B is drawing, viewed from the front, of the housing of the robot according to the embodiment in a case in which the robot is in the proper attitude state.

Note that, to facilitate comprehension, only the housing 207 of the robot 200 is illustrated in FIGS. 10A and 10B, and the exterior 201, the sensor 210, and the like are omitted. The same is true for the following FIGS. 11A to 14B as well.

An imaginary first reference plane 310 for determining the inclination of the torso 206 is set for the torso 206. Additionally, an imaginary second reference plane 320 for determining the inclination of the head 204 is set for the head 204. In FIGS. 10A and 10B, the first reference plane 310 and the second reference plane 320 are illustrated as dot-dash lines, and a vertical direction is illustrated as a dashed line. The first reference plane 310 and the second reference plane 320 are set so as to be parallel when the robot 200 is in the proper attitude state.

As illustrated in FIGS. 10A and 10B, when the robot 200 is in the proper attitude state, an angle A formed between the first reference plane 310 and the vertical direction, and an angle B formed between the second reference plane 320 and the vertical direction are both right angles (90 degrees) when viewing the housing 207 from the side. Additionally, an angle C formed between the first reference plane 310 and the vertical direction, and an angle D formed between the second reference plane 320 and the vertical direction are both right angles (90 degrees) when viewing the housing 207 from the front.

When both of the angles A and C formed between the first reference plane 310 and the vertical direction are within a predetermined error range from 90 degrees, the incline determiner 113 determines that the torso 206 is not inclined from the horizontal direction. In contrast, when at least one of the angles A and C formed between the first reference plane 310 and the vertical direction is offset from 90 degrees, the incline determiner 113 determines that the torso 206 is inclined from the horizontal direction.

In the following, the actions of the head 204 when the torso 206 is inclined from the proper attitude state are described while referencing FIGS. 11A to 14B.

Firstly, when the torso 206 is inclined in the front-back direction of the robot 200 from the horizontal direction, the action controller 112 causes the head 204 to rotate around the left-right direction with respect to the torso 206 such that the head 204 faces the horizontal direction.

Specifically, when inclined so as to lift up the front of the robot 200 as illustrated in FIG. 11A, the entire housing 207 is inclined in the front-back direction and, as such, the first reference plane 310 and the second reference plane 320 are offset from horizontal. In this case, an angle A1 formed between the first reference plane 310 and the vertical direction is smaller than the angle A that is 90 degrees. As such, the incline determiner 113 determines that the torso 206 is inclined from the horizontal direction.

In this case, as illustrated in FIG. 11B, the action controller 112 drives the vertical motor 222 and causes the head 204 to rotate with respect to the torso 206 such that the head 204 faces the horizontal direction. Specifically, the action controller 112 causes the vertical motor 222 to rotate an angle B1 downward around the second rotational axis extending in the left-right direction. As a result, the second reference plane 320 returns to horizontal and, thus, the head 204 faces the horizontal direction. The angle B1 is calculated by the absolute value of the difference between the angle A (90 degrees) and the angle A1.

Figure 12A:
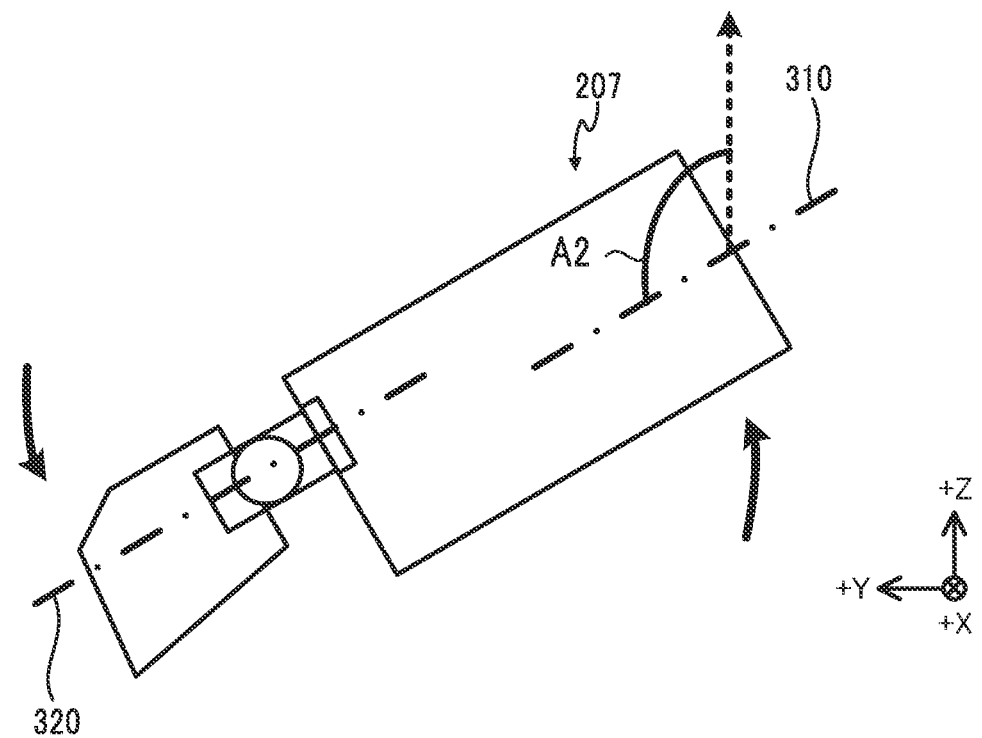
FIG. 12A is a second drawing illustrating a motion of the head in a case in which the robot according to the embodiment is inclined in the front-back direction, and is a drawing illustrating a state prior to the head moving.

When inclined so as to lift up the back of the robot 200 as illustrated in FIG. 12A, the entire housing 207 is inclined in the front-back direction and, as such, the first reference plane 310 and the second reference plane 320 are offset from horizontal. In this case, an angle A2 formed between the first reference plane 310 and the vertical direction is larger than the angle A that is 90 degrees. As such, the incline determiner 113 determines that the torso 206 is inclined from the horizontal direction.

Figure 12B:
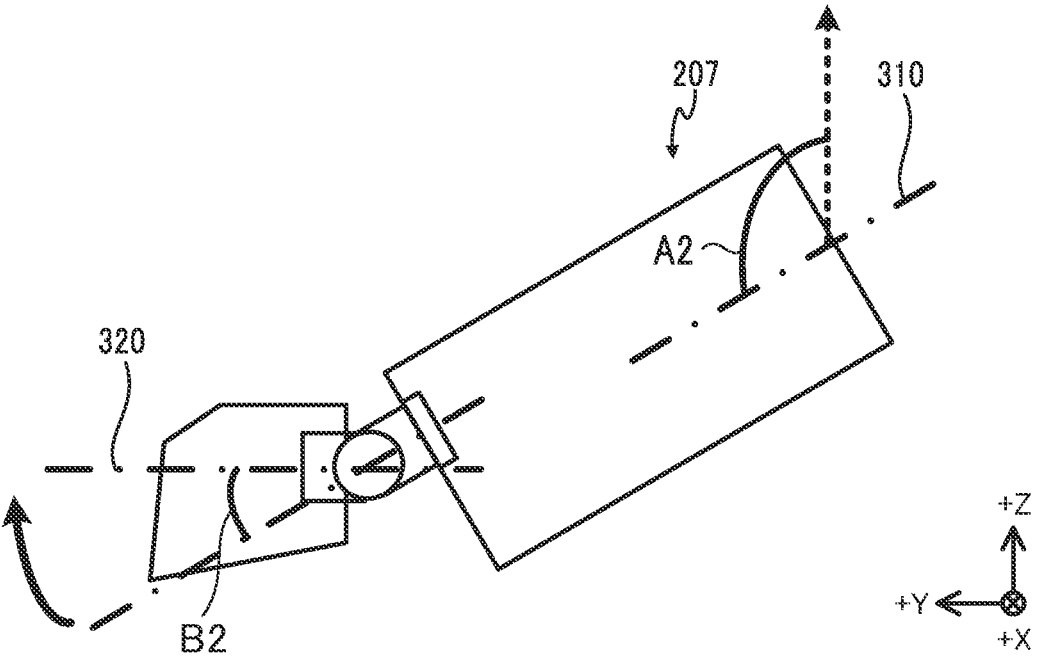
FIG. 12B is a second drawing illustrating a motion of the head in a case in which the robot according to the embodiment is inclined in the front-back direction, and is a drawing illustrating a state after the head moves.

In this case, as illustrated in FIG. 12B, the action controller 112 drives the vertical motor 222 and causes the head 204 to rotate with respect to the torso 206 such that the head 204 faces the horizontal direction. Specifically, the action controller 112 causes the vertical motor 222 to rotate an angle B2 upward around the second rotational axis extending in the left-right direction. As a result, the second reference plane 320 returns to horizontal and, thus, the head 204 faces the horizontal direction. The angle B2 is calculated by the absolute value of the difference between the angle A (90 degrees) and the angle A2.

Figure 13A:
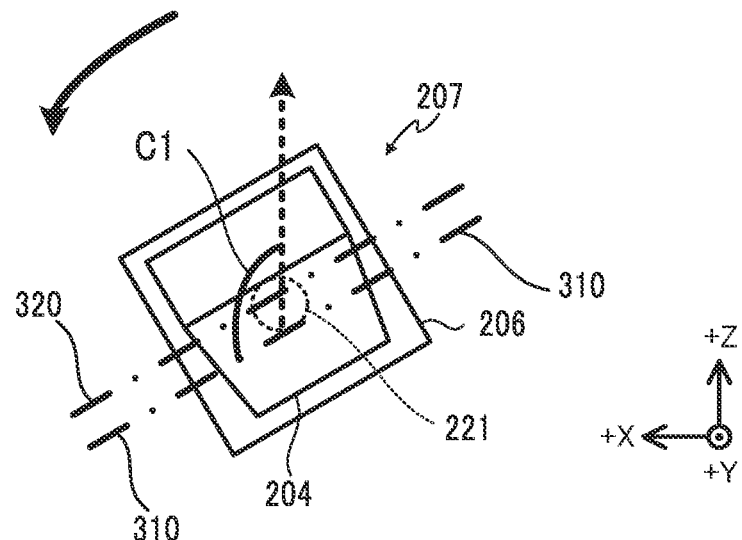
FIG. 13A is a first drawing illustrating a motion of the head in a case in which the robot according to the embodiment is inclined in a left-right direction, and is a drawing illustrating a state prior to the head moving.

Secondly, when the torso 206 is inclined in the left-right direction of the robot 200 from the horizontal direction, the action controller 112 causes the head 204 to rotate around the front-back direction with respect to the torso 206 such that the head 204 faces the horizontal direction. Specifically, when the robot 200 is inclined so as to be twisted clockwise as illustrated in FIG. 13A, the entire housing 207 is inclined in the left-right direction and, as such, the first reference plane 310 and the second reference plane 320 are offset from horizontal. In this case, an angle C1 formed between the first reference plane 310 and the vertical direction is larger than the angle C that is 90 degrees. As such, the incline determiner 113 determines that the torso 206 is inclined from the horizontal direction.

Figure 13B:
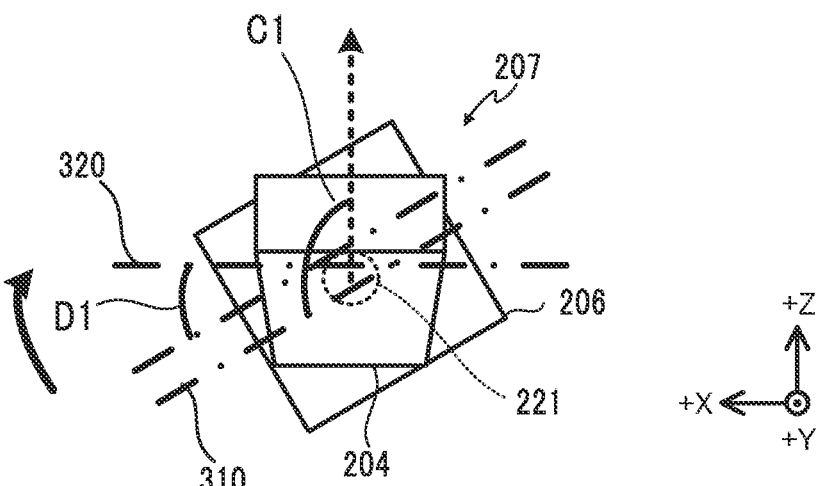
FIG. 13B is a first drawing illustrating a motion of the head in a case in which the robot according to the embodiment is inclined in the left-right direction, and is a drawing illustrating a state after the head moves.

In this case, as illustrated in FIG. 13B, the action controller 112 drives the twist motor 221 and causes the head 204 to rotate with respect to the torso 206 such that the head 204 faces the horizontal direction. Specifically, the action controller 112 causes the twist motor 221 to rotate an angle D1 counter-clockwise around the first rotational axis extending in the front-back direction. As a result, the second reference plane 320 returns to horizontal and, thus, the head 204 faces the horizontal direction. The angle D1 is calculated by the absolute value of the difference between angle C (90 degrees) and the angle C1.

Figure 14A:
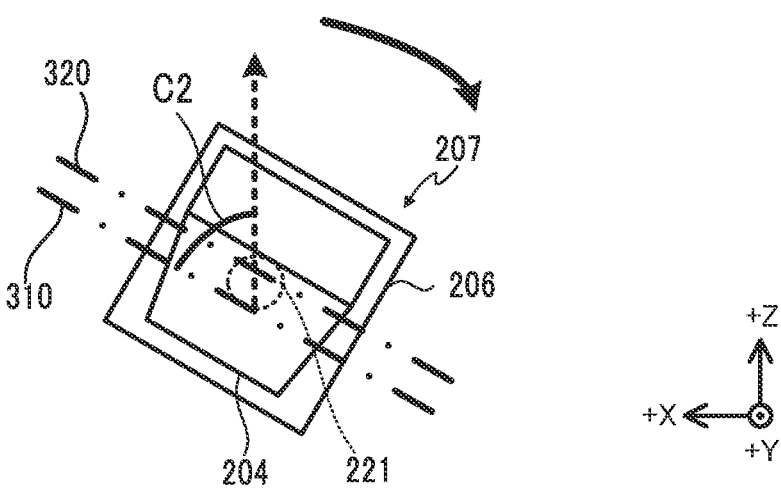
FIG. 14A is a second drawing illustrating a motion of the head in a case in which the robot according to the embodiment is inclined in the left-right direction, and is a drawing illustrating a state prior to the head moving.

When the robot 200 is inclined so as to be twisted counter-clockwise as illustrated in FIG. 14A, the entire housing 207 is inclined in the left-right direction and, as such, the first reference plane 310 and the second reference plane 320 are offset from horizontal. In this case, an angle C2 formed between the first reference plane 310 and the vertical direction is smaller than the angle C that is 90 degrees. As such, the incline determiner 113 determines that the torso 206 is inclined from the horizontal direction.

Figure 14B:
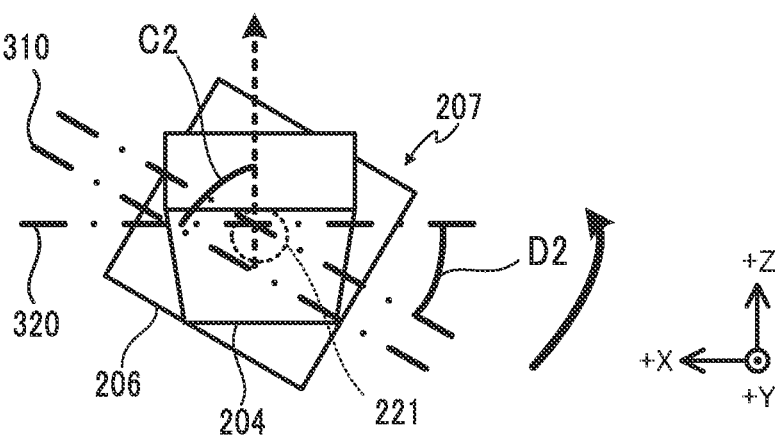
FIG. 14B is a second drawing illustrating a motion of the head in a case in which the robot according to the embodiment is inclined in the left-right direction, and is a drawing illustrating a state after the head moves.

In this case, as illustrated in FIG. 14B, the action controller 112 drives the twist motor 221 and causes the head 204 to rotate with respect to the torso 206 such that the head 204 faces the horizontal direction. Specifically, the action controller 112 causes the twist motor 221 to rotate an angle D2 clockwise around the first rotational axis extending in the front-back direction. As a result, the second reference plane 320 returns to horizontal and, thus, the head 204 faces the horizontal direction. The angle D2 is calculated by the absolute value of the difference between the angle C (90 degrees) and the angle C2.

More specifically, when the incline determiner 113 determines that the torso 206 is inclined from the horizontal direction, the action controller 112 determines whether a rotation angle of the head 204 for facing the head 204 in the horizontal direction is less than or equal to a limit angle. When the rotation angle of the head 204 is less than or equal to the limit angle, the action controller 112 causes the head 204 to rotate with respect to the torso 206 such that the head 204 faces the horizontal direction.

Here, the term "limit angle" corresponds to a limit angle of the twist motor 221 when rotating the head 204 around the front-back direction of the robot 200. When rotating the head 204 clockwise as illustrated in FIG. 4, the limit angle corresponds to +100, which is the upper limit of the forward rotation angle range and, when rotating the head 204 counter-clockwise as illustrated in FIG. 5, the limit angle is −100, which is the upper limit of the reverse rotation angle range. Additionally, the term "limit angle" corresponds to a limit angle of the vertical motor 222 when rotating the head 204 around the left-right direction of the robot 200. When rotating the head 204 upward as illustrated in FIG. 6, the limit angle corresponds to +100, which is the upper limit of the forward rotation angle range and, when rotating the head 204 downward as illustrated in FIG. 7, the limit angle is −100, which is the upper limit of the reverse rotation angle range.

As with the angle B1 illustrated in FIG. 11B, the angle B2 illustrated in FIG. 12B, the angle D1 illustrated in FIG. 13B, and the angle D2 illustrated in FIG. 14B, the rotation angle of the head 204 for facing the head 204 in the horizontal direction corresponds to an angle when rotating the head 204, from a current angle and by an amount corresponding to an amount of change of the inclination of the torso 206, in a direction opposite the direction in which the torso 206 is inclined. When the rotation angle of the head 204 for facing the head 204 in the horizontal direction exceeds the limit angle, the rotation angle exceeds the range rotatable by the twist motor 221 or the vertical motor 222. As such, in this case, the action controller 112 does not cause the head 204 to rotate with respect to the torso 206.

Next, a case is described in which, after head horizontal control processing such as that described above is executed, the action controller 112 causes the robot 200 to execute a corresponding action that corresponds to the type of the external stimulus acquired by the external stimulus acquirer 111. The corresponding action that the robot 200 executes in accordance with the external stimulus includes actions of rotating the head 204 with respect to the torso 206 such as, for example, a nodding action, a action of looking up, an action of shaking the head, an action of turning the head to the side, and the like. When causing the robot 200 to execute such a corresponding action after the head horizontal control processing is executed, the action controller 112 causes the head 204 to rotate with respect to the torso 206 using as a reference the angle of the head 204 formed after the head 204 has been rotated in the head horizontal control processing to face the horizontal direction.

Figure 15A:
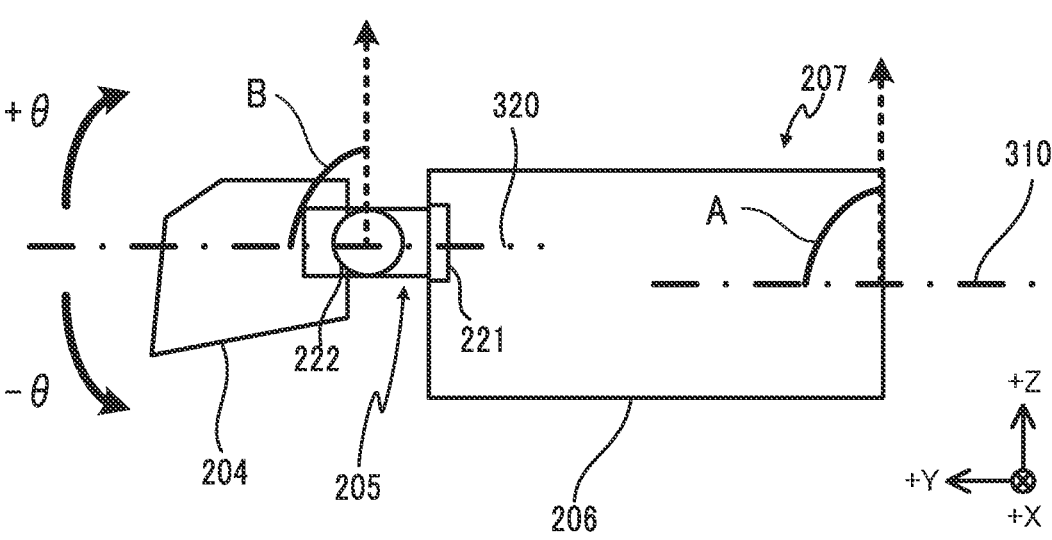
FIG. 15A is a drawing illustrating an example of the robot according to the embodiment executing an action of moving the head, and is a drawing illustrating a state in which the torso is not inclined.
Figure 15B:
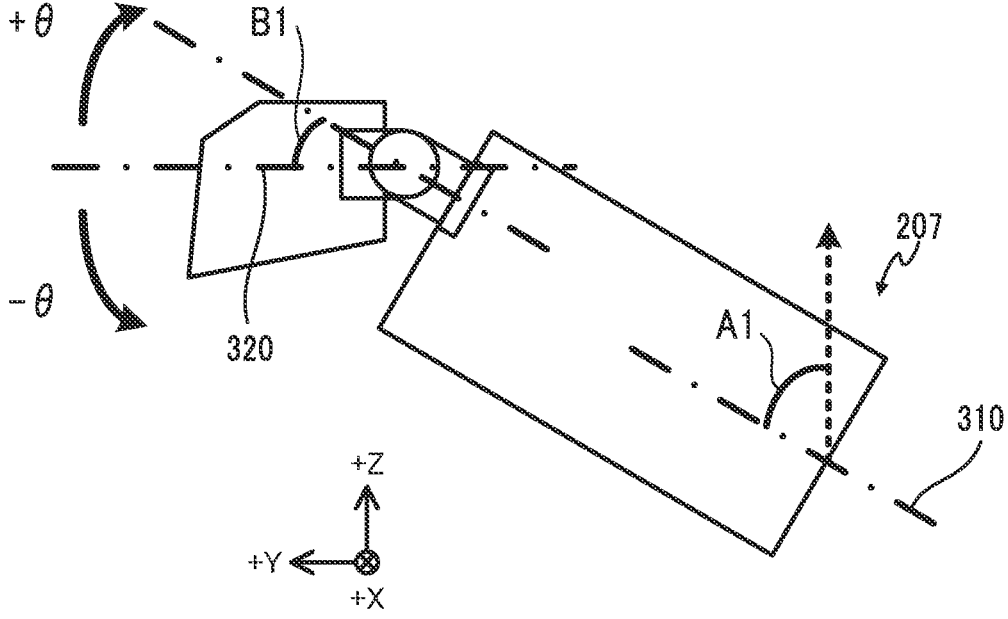
FIG. 15B is a drawing illustrating an example of the robot according to the embodiment executing an action of moving the head, and is a drawing illustrating a state in which the torso is inclined.

A specific description is given while referencing FIGS. 15A and 15B. FIG. 15A illustrates an example in which, in a case in which the torso 206 is not inclined from the horizontal direction, the action controller 112 causes the robot 200 to execute, as the corresponding action that corresponds to the type of the external stimulus, an action of rotating the head 204 an angle ±θ) with respect to the torso 206 by the vertical motor 222. In this case, the action controller 112 causes the head 204 to rotate with respect to the torso 206 the angle ±θ, using as a reference the vertical reference angle (0 in FIGS. 6 and 7) of the vertical motor 222.

In contrast, FIG. 15B illustrates an example in which, in a case in which the torso 206 is inclined from the horizontal direction, after the head 204 is rotated in the head horizontal control processing downward the angle B1, the action controller 112 causes the robot 200 to execute the same corresponding action as in FIG. 15A. In this case, the action controller 112 causes the head 204 to rotate with respect to the torso 206 the angle ±θ, using as a reference an angle rotated the angle B1 from the vertical reference angle.

In other words, in FIG. 15A, the action controller 112 causes the head 204 to rotate in a range of an angle θ to and angle −θ, without setting an offset to the rotation range of the vertical motor 222. In contrast, in FIG. 15B, the action controller 112 sets an offset of the angle B1 downward with respect to the rotation range of the vertical motor 222, and causes the head 204 to rotate in a range from an angle (−B1+θ) to an angle (−B1−θ).

Note that, while omitted from the drawings, when, after rotating the head 204 upward the angle B2 by the head horizontal control processing, causing the robot 200 to execute the same corresponding action, the action controller 112 sets the offset of the angle B2 upward for the rotation range of the vertical motor 222, and causes the head 204 to rotate in a range from an angle (B2+θ)) to an angle (B2−θ).

In FIGS. 15A and 15B, a case is described in which the head 204 is rotated by the vertical motor 222, but cases in which the head 204 is rotated by the twist motor 221 are the same. Specifically, when, after rotating the head 204 counter-clockwise the angle D1 by the head horizontal control processing, the action controller 112 causes the robot 200 to execute the same corresponding action, the action controller 112 sets the offset of the angle D1 counter-clockwise for the rotation range of the twist motor 221, and causes the head 204 to rotate in a range from an angle (−D1+θ) to an angle (D1−θ). Additionally, when, after rotating the head 204 clockwise the angle D2 by the head horizontal control processing, causing the robot 200 to execute the same corresponding action, the action controller 112 sets the offset of the angle D2 clockwise for the rotation range of the twist motor 221, and causes the head 204 to rotate in a range from an angle (D2+θ) to an angle (D2−θ).

Thus, at a time of the corresponding action that corresponds to the external stimulus, the action controller 112 sets the offset of the rotation range of the twist motor 221 or the vertical motor 222 so that the rotation angle of the head 204, after the head horizontal control, is the reference. By adjusting the action angle of the head 204 by this offset control, it is possible to naturally introduce the head horizontal control processing into the normal actions of the robot 200. Additionally, since the corresponding action differs in accordance with the inclination of the robot 200, the patterns of action of the robot 200 can be increased.

Figure 16:
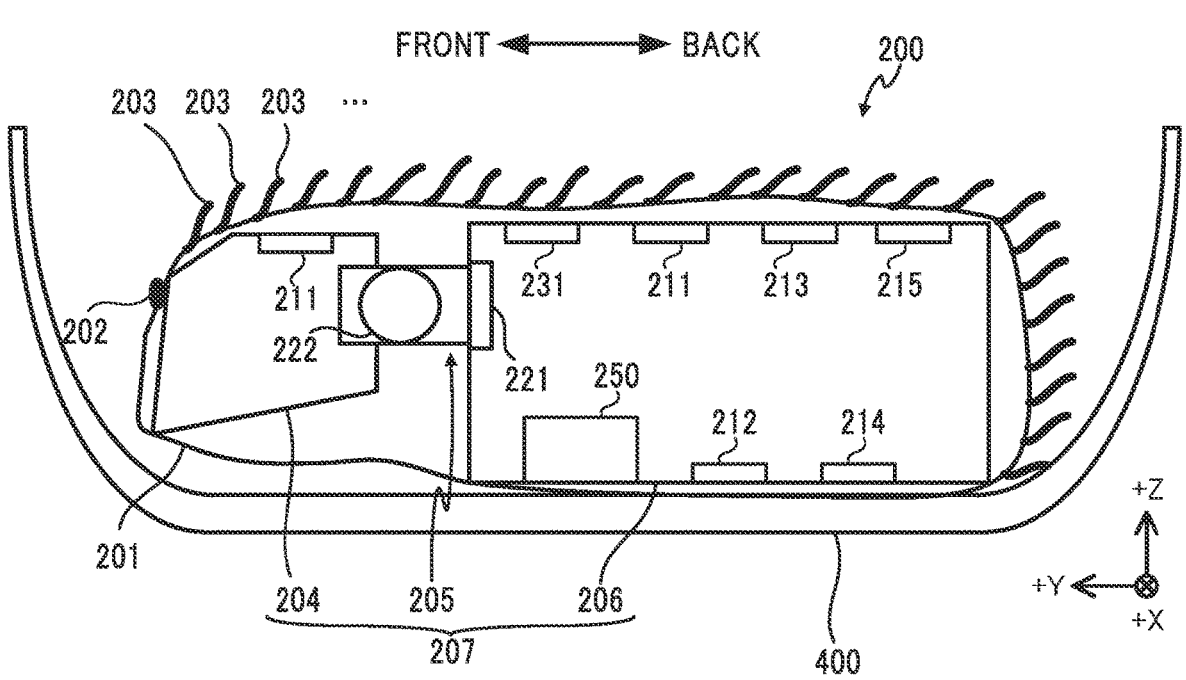
FIG. 16 is a drawing illustrating an example in which the robot according to the embodiment is being charged by a charging station.

Next, a case of the robot 200 being charged is described. FIG. 16 illustrates an example of a charging station 400 for charging the battery 250 of the robot 200. The charging station 400 is equipment for charging the robot 200.

The charging station 400 includes a stand upon which the robot 200 is placed. A power transmission coil is provided inside the stand. In a state in which the robot 200 is placed on the stand, the charging station 400 can wirelessly charge the battery 250 using electromagnetic induction, magnetic resonance, electric field coupling, or a similar known method.

The charging station 400 is installed at an appropriate location to which the robot 200 can autonomously move (return). When an amount of charge of the battery 250 is at a lower limit value or lower, or when a predetermined timing arrives, the robot 200 moves to the charging station 400 in order to charge the battery 250.

When the battery 250 is being charged at the charging station 400 as described above, when the head 204 rotates with respect to the torso 206, the attitude of the robot 200 on the stand changes and, as such, appropriate charging may be obstructed. For example, when the head 204 is rotated downward by the vertical motor 222, the torso 206 may rise up from the stand. Additionally, when the head 204 is rotated by the twist motor 221, the torso 206 may shift from the stand. In order to avoid situations in which the charging is obstructed, when the battery 250 is being charged, the action controller 112 does not cause the head 204 to rotate with respect to the torso 206, even when the incline determiner 113 determines that the torso 206 is inclined from the horizontal direction.

Note that a rotation speed at which the head 204 is rotated by the driver 220 (the twist motor 221 or the vertical motor 222) with respect to the torso 206 may be constant, or may vary in accordance with a condition. For example, a configuration is possible in which the action controller 112 varies, in accordance with an age of the robot 200, the rotation speed at which the head 204 is rotated with respect to the torso 206. In such a case, in order to simulate a real living organism, the rotation speed may be slowed more when the age of the robot 200 is less than a predetermined age than when the age of the robot 200 is greater than or equal to the predetermined age. Here, the age of the robot 200 corresponds to, for example, an amount of time from the manufacture or shipping of the robot 200.

Figure 17:
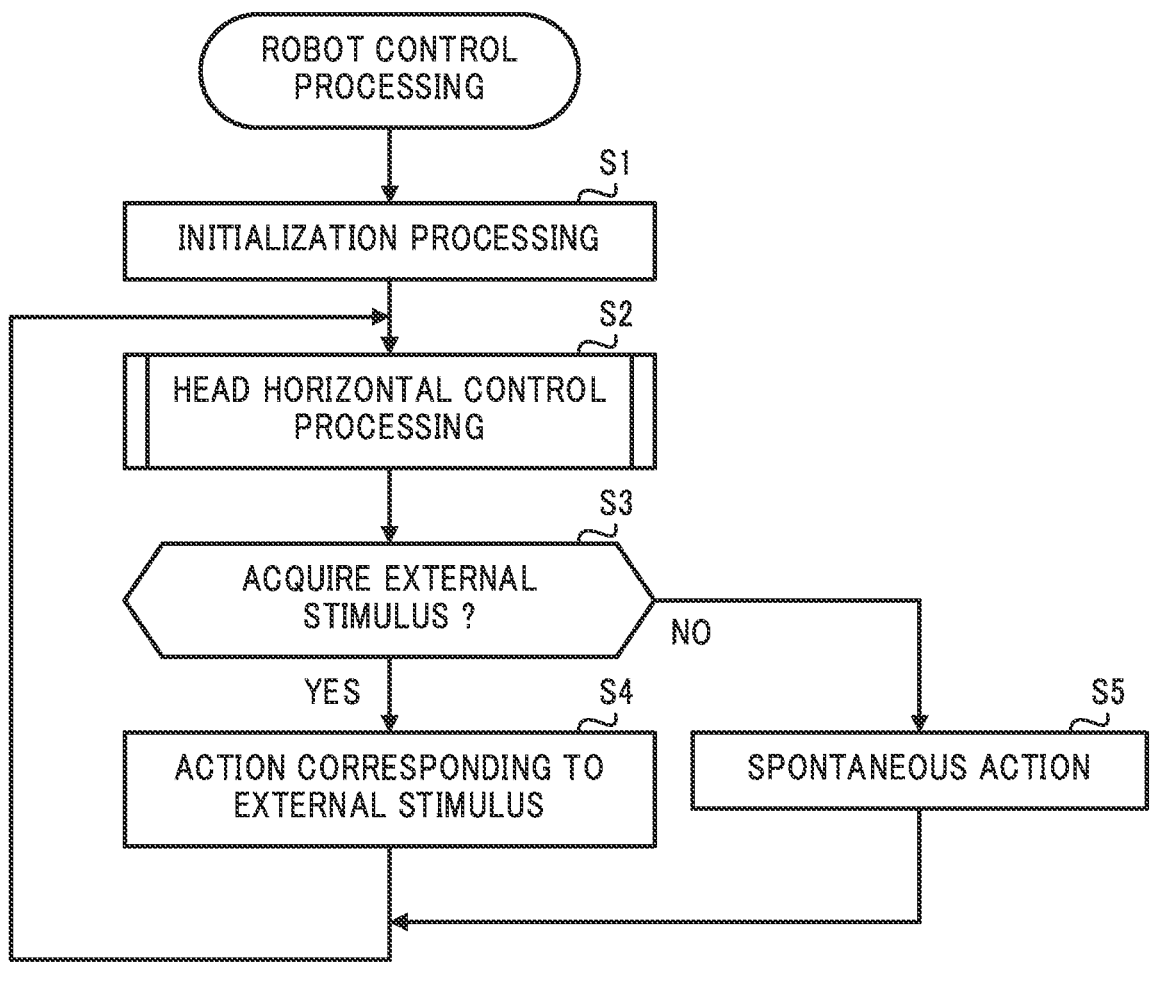
FIG. 17 is a flowchart illustrating the flow of robot control processing according to the embodiment.

Next, the flow of robot control processing according to the present embodiment is described while referencing FIG. 17. The robot control processing illustrated in FIG. 17 is executed by the controller 110 of the control device 100, with the power of the robot 200 being turned ON as a trigger. The robot control processing illustrated in FIG. 17 is an example of a robot control method.

When the robot control processing starts, the controller 110 executes initialization processing (step S1). In the initialization processing, in one example, the controller 110 sets the rotation angle of the twist motor 221 to a twist reference angle, namely 0, sets the rotation angle of the vertical motor 222 to a vertical reference angle, namely 0, and sets a system timer to 0.

When the initialization processing is executed, the controller 110 executes the head horizontal control processing (step S2). The controller 110 executes the head horizontal control processing as interrupt processing at a certain time interval (for example, 100 ms interval). Details of the head horizontal control processing of step S2 are described while referencing FIG. 18.

Figure 18:
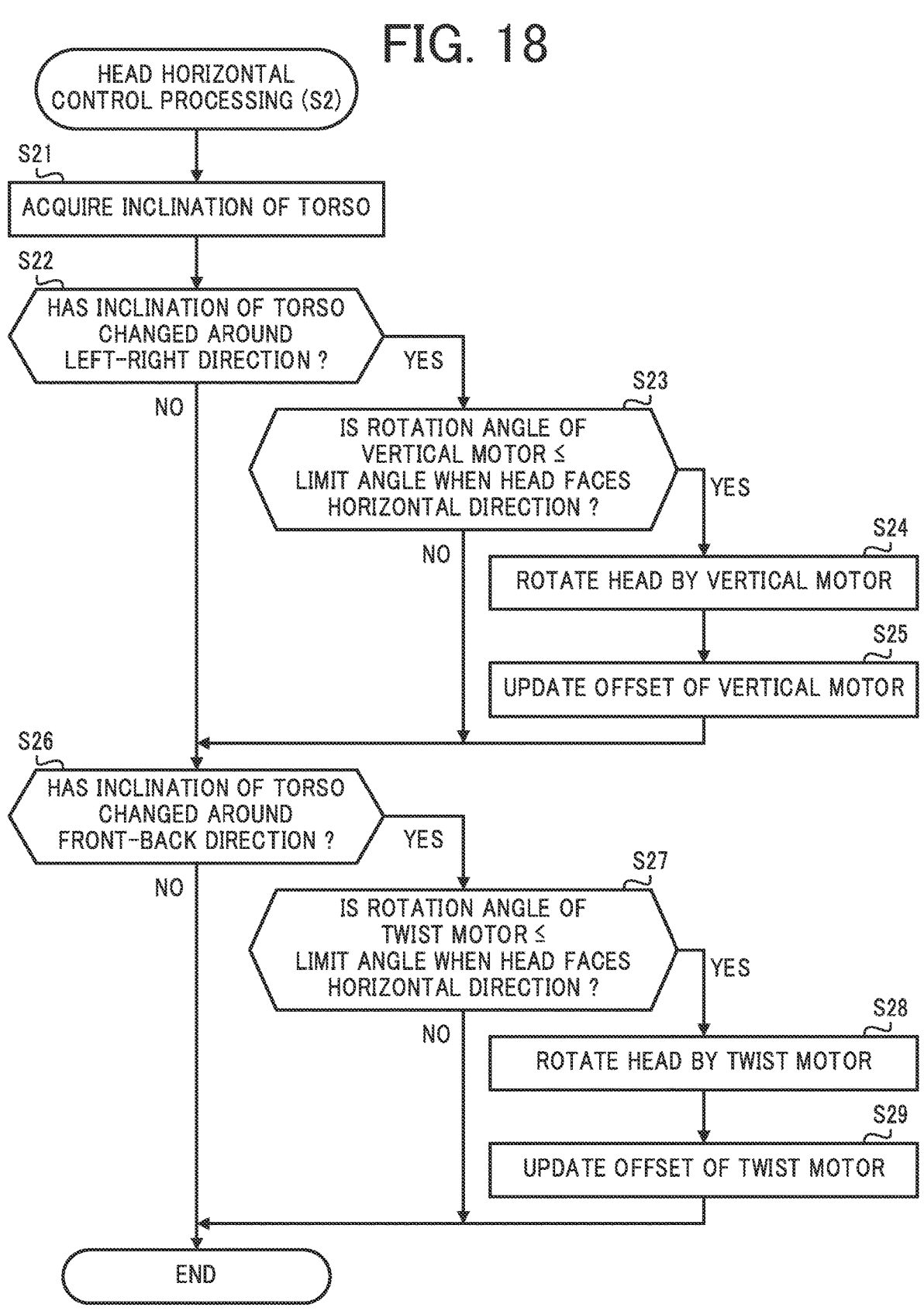
FIG. 18 is a flowchart illustrating the flow of head horizontal control processing according to the embodiment.

When the head horizontal control processing illustrated in FIG. 18 starts, the controller 110 acquires the inclination of the torso 206 (step S21). Specifically, the controller 110 acquires the direction of gravitational acceleration detected by the acceleration sensor 212. Then, the controller 110 acquires the inclination of the torso 206 by calculating the angle formed between direction of gravitational acceleration and the first reference plane 310 set for the torso 206.

When the inclination of the torso 206 is acquired, the controller 110 functions as the incline determiner 113 and determines whether the inclination of the torso 206 has changed around the left-right direction of the robot 200 (step S22). Specifically, as illustrated in FIGS. 11A and 12A, the controller 110 determines whether the torso 206 is inclined in the front-back direction. Step S22 is an example of an inclination determination step.

When the inclination of the torso 206 has changed around the left-right direction of the robot 200 (step S22; YES), the controller 110 determines whether the rotation angle of the vertical motor 222 when the head 204 is facing the horizontal direction is less than or equal to the limit angle (step S23).

When the rotation angle of the vertical motor 222 is less than or equal to the limit angle (step S23; YES), the controller 110 functions as the action controller 115 and causes the vertical motor 222 to rotate the head 204 (step S24). Specifically, as illustrated in FIGS. 11B and 12B, the controller 110 causes the head 204 to rotate, in a direction opposite the direction in which the torso 206 is inclined, an amount corresponding to the amount of change of the inclination of the torso 206 acquired in step S1. As a result, the direction of the head 204 is adjusted to horizontal, even when the torso 206 is inclined. Step S24 is an example of an action control step.

When the head 204 is rotated by the vertical motor 222, the controller 110 updates the offset of the vertical motor 222 to the angle after rotating in step S24 (step S25).

In contrast, when the rotation angle of the vertical motor 222 exceeds the limit angle (step S23; NO), the controller 110 skips steps S24 and S25. In this case, rotating the head 204 an amount that cancels out the change of the inclination of the torso 206 leads to the rotation angle of the vertical motor 222 exceeding the limit angle and, as such, the controller 110 does not cause the vertical motor 222 to rotate.

When the inclination of the torso 206 has not changed around the left-right direction of the robot 200 (step S22; NO), the controller 110 skips the processing of steps S23 to S25.

Next, the controller 110 functions as the incline determiner 113 and determines whether the inclination of the torso 206 has changed around the front-back direction of the robot 200 (step S26). Specifically, as illustrated in FIGS. 13A and 14A, the controller 110 determines whether the torso 206 is inclined in the left-right direction. Step S26 is an example of the inclination determination step.

When the inclination of the torso 206 has changed around the front-back direction of the robot 200 (step S26; YES), the controller 110 determines whether the rotation angle of the twist motor 221 when the head 204 is facing the horizontal direction is less than or equal to the limit angle (step S27).

When the rotation angle of the twist motor 221 is less than or equal to the limit angle (step S27; YES), the controller 110 functions as the action controller 115 and causes the twist motor 221 to rotate the head 204 (step S28). Specifically, as illustrated in FIGS. 13B and 14B, the controller 110 causes the head 204 to rotate, in a direction opposite the direction in which the torso 206 is inclined, an amount corresponding to the amount of change of the inclination of the torso 206 acquired in step S1. As a result, the direction of the head 204 is adjusted to horizontal, even when the torso 206 is inclined. Step S28 is an example of the action control step.

When the head 204 is rotated by the twist motor 221, the controller 110 updates the offset of the twist motor 221 to the angle after rotating in step S28 (step S29).

In contrast, when the rotation angle of the twist motor 221 exceeds the limit angle (step S27; NO), the controller 110 skips steps S28 and S29. In this case, rotating the head 204 an amount that cancels out the change of the inclination of the torso 206 leads to the rotation angle of the twist motor 221 exceeding the limit angle and, as such, the controller 110 does not cause the twist motor 221 to rotate.

When the inclination of the torso 206 has not changed around the front-back direction of the robot 200 (step S26; NO), the controller 110 skips the processing of steps S27 to S29. Thus, the head horizontal control processing illustrated in FIG. 18 is ended.

Note that, while omitted from the drawings, in a case in which the battery 250 is being charged at the charging station 400, the controller 110 skips the head horizontal control processing illustrated in FIG. 18.

Returning to FIG. 17, when the attitude of the robot 200 is controlled in step S2, the controller 110 functions as the external stimulus acquirer 111, and determines whether an external stimulus is acquired (step S3). Specifically, the controller 110 determines, on the basis of the detection values by the sensor 210, whether an external stimulus such as "there is a loud sound", "spoken to", "petted", "picked up", "turned upside down", "became brighter", "became darker", or the like has occurred. Step S3 is an example of an external stimulus acquisition step.

When an external stimulus is acquired (step S3; YES), the controller 110 functions as the action controller 115 and causes the robot 200 to execute an action corresponding to the type of the external stimulus executed in step S3 (step S4). For example, when the type of the acquired external stimulus is "there is a loud sound", the controller 110 causes the robot 200 to execute an action of reacting to the loud sound. When the type of the acquired external stimulus is "turned upside down", the controller 110 causes the robot 200 to execute an action of reacting to being turned upside down. When the type of the acquired external stimulus is "spoken to", the controller 110 causes the robot 200 to execute an action of reacting to being spoken to. When the type of the acquired external stimulus is "petted", the controller 110 causes the robot 200 to execute an action of reacting to being petted.

At this time, when the action corresponding to the type of the external stimulus includes an action of rotating the head 204 with respect to the torso 206 and, also, an offset is set in the bead horizontal control processing of step S2, the controller 110 causes the head 204 to rotate with respect to the torso 206 using as a reference an angle acquired by adding the offset to the vertical reference angle or the twist reference angle.

Meanwhile, when an external stimulus is not acquired in step S3 (step S3; NO), the controller 110 causes, as necessary, the robot 200 to execute a spontaneous action (step S5). Specifically, the controller 110 causes the robot 200 to execute an action that is not dependent on an external stimulus, such as an action simulating breathing, for example.

After causing the robot 200 to act in step S4 or S5, the controller 110 returns to the processing of step S2 and again executes the processing of steps S2 to S5. Thus, the controller 110 repeatedly executes the processing of steps S2 to S5 as long as the power of the robot 200 is turned ON and the robot 200 is capable of normal operation.

As described above, the robot 200 according to the present embodiment determines whether the torso 206 is inclined from the horizontal direction and, when the torso 206 is inclined from the horizontal direction, causes the head 204 to rotate with respect to the torso 206 such that the head 204 faces the horizontal direction. Due to this head horizontal control, it is possible to simulate the actions of a living organism that is attempting to maintain the head at horizontal when the body is inclined. As a result, the robot 200 of the present embodiment can realistically simulate a living organism and can enhance lifelikeness.

For example, in a state in which the user lifts up the robot 200 with both hands, when the user inclines the robot 200, the robot 200 adjusts the direction of the head 204 to the horizontal direction by the head horizontal control. Due to such an action, the user is given the impression that the robot 200 is constantly trying to face the head 204 in the direction of the user, particularly when the user is facing the robot 200, and is given the impression that the robot 200 is trying to communicate with the user. As a result, familiarity with the robot 200 can be enhanced.

Modified Examples

Embodiments of the present disclosure are described above, but these embodiments are merely examples and do not limit the scope of application of the present disclosure.

That is, various applications of the embodiments of the present disclosure are possible, and all embodiments are included in the scope of the present disclosure.

For example, in the embodiment described above, the head 204 is coupled to the torso 206 so as to be rotatable, by the twist motor 221 and the vertical motor 222, around the left-right direction and the front-back direction with respect to the torso 206. However, the head 204 is not limited to being rotatable in the two directions of the left-right direction and the front-back direction with respect to the torso 206, and a configuration is possible in which the head 204 is coupled to the torso 206 so as to rotatable around only one of the directions described above, or may be coupled to the torso 206 so as to be rotatable around another direction.

In the embodiment described above, the exterior 201 is formed in a barrel shape from the head 204 to the torso 206, and the robot 200 has a shape as if lying on its belly. However, the robot 200 is not limited to resembling a living organism that has a shape as if lying on its belly. For example, a configuration is possible in which the robot 200 has a shape provided with arms and legs, and resembles a living organism that walks on four legs or two legs. Living organisms that walk on four legs and living organisms that walk on two legs both have a trait of maintaining the head at horizontal when the torso is inclined from the horizontal direction. As such, a living organism can be realistically simulated by executing the bead horizontal control of the embodiment described above.

In the embodiment described above, the control device 100 is installed in the robot 200, but a configuration is possible in which the control device 100 is not installed in the robot 200 but, rather, is a separated device (for example, a server). When the control device 100 is provided outside the robot 200, the robot 200 and the control device 100 communicate and exchange data with each other via communicators. The external stimulus acquirer 111 acquires the external stimulus detected by the sensor 210, and the action controller 112 controls the driver 220 and the outputter 230 via communication with such a robot 200.

In the embodiment described above, in the controller 110, the CPU executes the program stored in the ROM to function as the various components, namely, the external stimulus acquirer 111, the action controller 112, and the incline determiner 113. However, in the present disclosure, the controller 110 may include, for example, dedicated hardware such as an Application Specific Integrated Circuit (ASIC), a Field-Programmable Gate Array (FPGA), various control circuitry, or the like instead of the CPU, and this dedicated hardware may function as the various components, namely the external stimulus acquirer 111, the action controller 112, and the incline determiner 113. In this case, the functions of each of the components may be realized by individual pieces of hardware, or the functions of each of the components may be collectively realized by a single piece of hardware. Additionally, the functions of each of the components may be realized in part by dedicated hardware and in part by software or firmware.

It is possible to provide a robot provided in advance with the configurations for realizing the functions according to the present disclosure, but it is also possible to apply a program to cause an existing information processing device or the like to function as the robot according to the present disclosure. That is, a configuration is possible in which a CPU or the like that controls an existing information processing apparatus or the like is used to execute a program for realizing the various functional components of the robot 200 described in the foregoing embodiments, thereby causing the existing information processing device to function as the robot according to the present disclosure.

Any method may be used to apply the program. For example, the program can be applied by storing the program on a non-transitory computer-readable recording medium such as a flexible disc, a compact disc (CD) ROM, a digital versatile disc (DVD) ROM, and a memory card. Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the program and, under the control of the operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A robot, comprising:
   a torso;
   a head coupled to the torso so as to be rotatable with respect to the torso; and
   at least one processor configured to execute processes comprising:
      determining whether the torso is inclined with respect to a horizontal direction; and
      in response to determining that the torso is inclined with respect to the horizontal direction, controlling an actuator to rotate the head with respect to the torso such that the head faces the horizontal direction.

2. The robot according to claim 1, wherein:
   the head is coupled to the torso so as to be rotatable around a left-right direction of the robot with respect to the torso, and
   the controlling comprises, in response to determining that the robot is inclined in a front-back direction with respect to the horizontal direction, controlling the actuator to rotate the head around the left-right direction with respect to the torso such that the head faces the horizontal direction.

3. The robot according to claim 1, wherein:
   the head is coupled to the torso so as to be rotatable around a front-back direction of the robot with respect to the torso, and
   the controlling comprises, in response to determining that the robot is inclined in a left-right direction with respect to the horizontal direction, controlling the actuator to rotate the head around the front-back direction with respect to the torso such that the head faces the horizontal direction.

4. The robot according to claim 1, wherein the controlling comprises:
   in response to determining that the torso is inclined with respect to the horizontal direction, further determining whether a rotation angle of the head for facing the head in the horizontal direction is less than or equal to a limit angle, in response to determining that the rotation angle is less than or equal to the limit angle, controlling the actuator to rotate the head with respect to the torso such that the head faces the horizontal direction, and
   in response to determining that the rotation angle exceeds the limit angle, controlling so as not to rotate the head with respect to the torso.

5. The robot according to claim 1, further comprising:
   a sensor that detects an external stimulus,
   wherein the controlling comprises, after rotating the head with respect to the torso such that the head faces the horizontal direction, (i) controlling the robot to execute a corresponding action that corresponds to a type of the external stimulus acquired by the sensor, and (ii) rotating the head with respect to the torso using as a reference an angle of the head formed after having rotated the head so as to face the horizontal direction.

6. The robot according to claim 1, further comprising:
   a battery that stores power to be used in the robot,
   wherein when the battery is charging, the controlling controls so as not to rotate the head with respect to the torso even in response to determining that the torso is inclined with respect to the horizontal direction.

7. The robot according to claim 1, further comprising:
   an exterior member that integrally covers the torso and the head and that conforms to rotation of the head relative to the torso,
   wherein the exterior member is formed in a barrel shape from the head throughout the torso.

8. The robot according to claim 7, wherein the robot is formed in a shape as if lying on its belly.

9. A control method for a robot that includes a torso, and a head coupled to the torso so as to be rotatable with respect to the torso, the control method comprising:
   determining whether the torso is inclined with respect to a horizontal direction; and
   in response to determining that the torso is inclined with respect to the horizontal direction, controlling an actuator to rotate the head with respect to the torso such that the head faces the horizontal direction.

10. The control method for a robot according to claim 9, wherein:
   the head is coupled so as to be rotatable around a left-right direction of the robot with respect to the torso, and
   the controlling includes, in response to determining that the torso is inclined in a front-back direction of the robot with respect to the horizontal direction, controlling the actuator to rotate the head around the left-right direction with respect to the torso such that the head faces the horizontal direction.

11. The control method for a robot according to claim 9, wherein:
   the head is coupled to the torso so as to be rotatable around a front-back direction of the robot with respect to the torso, and
   the controlling includes, in response to determining that the torso is inclined in a left-right direction of the robot with respect to the horizontal direction, controlling the actuator to rotate the head around the front-back direction with respect to the torso such that the head faces the horizontal direction.

12. The control method for a robot according to claim 9, wherein the controlling includes:
   in response to determining that the torso is inclined with respect to the horizontal direction, further determining whether a rotation angle of the head for facing the head in the horizontal direction is less than or equal to a limit angle;

in response to determining that the rotation angle is less than or equal to the limit angle, controlling the actuator to rotate the head with respect to the torso such that the head faces the horizontal direction; and in response to determining that the rotation angle exceeds the limit angle, controlling so as not to rotate the head with respect to the torso.

13. The control method for a robot according to claim 9, wherein the controlling includes, after rotating the head with respect to the torso such that the head faces the horizontal direction, (i) controlling the robot to execute a corresponding action that corresponds to a type of an external stimulus acquired by a sensor, and (ii) rotating the head with respect to the torso using as a reference an angle of the head formed after having rotated the head so as to face the horizontal direction.

14. The control method for a robot according to claim 9, wherein the controlling includes, when a battery that stores power used in the robot is charging, controlling so as not to rotate the head with respect to the torso even in response to determining that the torso is inclined with respect to the horizontal direction.

15. A non-transitory recording medium storing a program readable by a computer of a robot that that comprises a torso and a head coupled to the torso so as to be rotatable with respect to the torso, the program being executable to control the computer to realize functions comprising:

determining whether the torso is inclined with respect to a horizontal direction; and in response to determining that the torso is inclined with respect to the horizontal direction, controlling an actuator to rotate the head with respect to the torso such that the head faces the horizontal direction.

16. The non-transitory recording medium according to claim 15, wherein:

the head is coupled to the torso so as to be rotatable around a left-right direction of the robot with respect to the torso, and the controlling comprises, in response to determining that the torso is inclined in a front-back direction of the robot with respect to the horizontal direction, controlling the actuator to rotate the head around the left-right direction with respect to the torso such that the head faces the horizontal direction.

17. The non-transitory recording medium according to claim 15, wherein;

the head is coupled to the torso so as to be rotatable around the front-back direction of the robot with respect to the torso, and the controlling comprises, in response to determining that the torso is inclined in a left-right direction of the robot with respect to the horizontal direction, controlling the actuator to rotate the head around the front-back direction with respect to the torso such that the head faces the horizontal direction.

18. The non-transitory recording medium according to claim 15, wherein the controlling comprises:

in response to determining that the torso is inclined with respect to the horizontal direction, further determining whether a rotation angle of the head for facing the head in the horizontal direction is less than or equal to a limit angle, in response to determining that the rotation angle is less than or equal to the limit angle, controlling the actuator to rotate the head with respect to the torso such that the head faces the horizontal direction, and in response to determining that the rotation angle exceeds the limit angle, controlling so as not to rotate the head with respect to the torso.

19. The non-transitory recording medium according to claim 15, wherein the controlling comprises, after rotating the head with respect to the torso such that the head faces the horizontal direction, (i) controlling the robot to execute a corresponding action that corresponds to a type of an external stimulus acquired by a sensor, and (ii) rotating the head with respect to the torso using as a reference an angle of the head formed after having rotated the head so as to face the horizontal direction.

20. The non-transitory recording medium according to claim 15, wherein the controlling comprises, when a battery that stores power used in the robot is charging, controlling so as not to rotate the head with respect to the torso even in function response to determining that the torso is inclined with respect to the horizontal direction.

* * * * *